United States Patent
Uralsky et al.

(10) Patent No.: US 12,197,954 B2
(45) Date of Patent: Jan. 14, 2025

(54) PROGRAMMING MODEL FOR RESOURCE-CONSTRAINED SCHEDULING

(71) Applicant: NVIDIA CORPORATION, Santa Clara, CA (US)

(72) Inventors: Yury Uralsky, Los Gatos, CA (US); Henry Moreton, Woodside, CA (US); Matthijs de Smedt, San Jose, CA (US); Lei Yang, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 705 days.

(21) Appl. No.: 17/204,508

(22) Filed: Mar. 17, 2021

(65) Prior Publication Data

US 2021/0294660 A1    Sep. 23, 2021

Related U.S. Application Data

(60) Provisional application No. 62/992,872, filed on Mar. 20, 2020.

(51) Int. Cl.
*G06F 9/50* (2006.01)
*G06T 1/20* (2006.01)
*G06T 1/60* (2006.01)

(52) U.S. Cl.
CPC .......... *G06F 9/5038* (2013.01); *G06F 9/5011* (2013.01); *G06F 9/5055* (2013.01); *G06F 9/5072* (2013.01); *G06T 1/20* (2013.01); *G06T 1/60* (2013.01)

(58) Field of Classification Search
CPC ........ G06F 9/50; G06F 9/5005; G06F 9/5011; G06F 9/5016; G06F 9/5022; G06F 9/5027; G06F 9/52
See application file for complete search history.

(56) References Cited

U.S. PATENT DOCUMENTS

| | | | |
|---|---|---|---|
| 4,964,040 A | 10/1990 | Wilcox | |
| 6,430,593 B1 * | 8/2002 | Lindsley | ............... G06F 9/4843 712/34 |

(Continued)

OTHER PUBLICATIONS

Du et al., "From CUDA to OpenCL: Towards a performance-portable solution for multi-platform GPU programming", Parallel Computing. 38 (8): 391-407 (2012).

(Continued)

*Primary Examiner* — Andy Ho
(74) *Attorney, Agent, or Firm* — Nixon & Vanderhye P.C.

(57) ABSTRACT

The present technology augments the GPU compute model to provide system-provided data marshalling characteristics of graphics pipelining to increase efficiency and reduce overhead. A simple scheduling model based on scalar counters (e.g., semaphores) abstract the availability of hardware resources. Resource releases can be done programmatically, and a system scheduler only needs to track the states of such counters/semaphores to make work launch decisions. Semantics of the counters/semaphores are defined by an application, which can use the counters/semaphores to represent the availability of free space in a memory buffer, the amount of cache pressure induced by the data flow in the network, or the presence of work items to be processed.

15 Claims, 34 Drawing Sheets

(56) References Cited

U.S. PATENT DOCUMENTS

| | | | |
|---|---|---|---|
| 7,353,515 B1 * | 4/2008 | Ton | G06F 9/52 |
| | | | 718/100 |
| 7,472,237 B1 * | 12/2008 | Herbst | H04L 69/161 |
| | | | 711/152 |
| 8,068,114 B2 * | 11/2011 | Andre | G06F 13/4234 |
| | | | 345/541 |
| 8,180,998 B1 | 5/2012 | Maher et al. | |
| 9,164,690 B2 | 10/2015 | Khailany et al. | |
| 9,223,578 B2 | 12/2015 | Nickolls et al. | |
| 9,753,779 B2 * | 9/2017 | Maruyama | G06F 9/5038 |
| 9,772,888 B2 * | 9/2017 | Richardson | G06F 9/526 |
| 10,152,436 B2 * | 12/2018 | Fernando | G06F 13/1668 |
| 2013/0198760 A1 | 8/2013 | Cuadra | |
| 2014/0282566 A1 | 9/2014 | Lindholm et al. | |
| 2019/0236827 A1 | 8/2019 | Hakura et al. | |

OTHER PUBLICATIONS

Tarditi et al., "Accelerator: using data parallelism to program GPUs for general-purpose uses", ACM SIGARCH Computer Architecture News. 34 (5) (2006).

Leslie G. Valiant, A bridging model for parallel computation, Communications of the ACM, vol. 33 Issue 8, Aug. 1990.

U.S. Appl. No. 16/712,236, filed Dec. 12, 2019 entitled "High Performance Synchronization Mechanisms for Coordinating Operations on a Computer System".

Zhang et al., "Taming Irregular Applications via Advanced Dynamic Parallelism on GPUs" CF '18 (Ischia, Italy, May 8-10, 2018).

Morris et al., "Kite: Braided Parallelism for Heterogeneous Systems" (Computer Science 2012).

Jonathan Ragan-Kelley, Keeping Many Cores Busy: Scheduling the Graphics Pipeline, Beyond Programmable Shading II (SIGGRAPH Sep. 20, 2010).

Kubisch, GPU-Driven Rendering (NVIDIA, GTC Silicon Valley Apr. 4, 2016).

Node US, "Backpressuring in Streams", https://nodejs.org/en/docs/guides/backpressuring-in-streams/, Jan. 6, 2020.

Somasundaram et al, Node Allocation In Grid Computing Using Optimal Resource Constraint (ORC) Scheduling, IJCSNS International Journal of Computer Science and Network Security, vol. 8 No. 6 (Jun. 2008).

Communication relating to the results of the Partial International Search (PCT/ISA/206) issued in PCT/US2021/022766 dated Jun. 22, 2021 (14 pages).

International Search Report & Written Opinion issued in PCT/US2021/022766 dated Aug. 12, 2021 (18 pages).

* cited by examiner

FIG. 9A

Task table - 0 to N

| | Sr actual | Sf index | Address to task code | Sf decrement value (default=1) | aggregate value | window time |
|---|---|---|---|---|---|---|
| Task Entry 0 | | | | | | |
| Task Entry 1 | | | | | | |
| Task Entry 2 | | | | | | |
| ... | | | | | | |
| Task Entry N | | | | | | |

1002(0), 1002(1), 1002(2), 1002(N)

Semaphores 0 to M; for Sf semaphores only

| | count value |
|---|---|
| Semaphore SF(0) | |
| Semaphore SF(1) | |
| Semaphore SF(2) | |
| ... | |
| Semaphore SF(M) | |

1004(0), 1004(1), 1004(2), 1004(N)

- Option 1) End of work token to propagate through pipeline to designate work done
- Option 2) Wait for queues to become empty and any actively executing nodes to stop running
- Option 3) User code in task determines when done and signals 1006, 1008, 1010, 1012, 1014, 1016

Task 1, Task 2, Task 3, Task 4

PROGRAMMING MODEL FOR RESOURCE-CONSTRAINED SCHEDULING

CROSS-REFERENCE TO RELATED APPLICATION

This application claims priority from U.S. provisional patent application No. 62/992,872 filed 2020 Mar. 20, incorporated herein by reference.

FIELD

The technology herein relates to graphics processing units (GPUs), and more particularly to scheduling work for a graphics processing unit to perform.

BACKGROUND & SUMMARY

FIG. 1 illustrates how many or most conventional graphics processing units (GPUs) are capable of processing different kinds of workloads, such as graphics workloads and compute workloads. There are differences between how graphics workloads and compute workloads are scheduled.

Graphics workloads typically comprise sets of logical stages in the processing of graphics data related to shading pixels of an image. In this context, the shading of pixels typically develops visualization (brightness, color, contrast or other visual characteristic) information affecting the appearance of one or more pixels of an image.

A GPU typically uses a graphics pipeline to process graphics workloads. The left-hand side of FIG. 1 shows a typical graphics pipeline comprising a series of shader stages 10 that communicate using pipelined on-chip memory 11. The graphics pipeline thus provides a sequence of logical stages for graphics processing as a pipelined sequence of shader stages 10a, 10b, . . . , 10n, where each shader stage 10 in the sequence performs a respective graphics computation. In the graphics pipeline is shown in the left-hand side of FIG. 1, each shader stage 10 operates on the result(s) of a preceding stage(s) in the pipeline and provides processed results for further processing by a subsequent stage(s) in the pipeline. Graphics processing distributed across hardware defined by a hardware-based graphics pipeline has been proven to be very efficient and is a basis for most modern GPU designs.

Such graphics programming models are thus built around the notion of a fixed-function graphics pipeline that is scheduled at a fine grain in a producer-consumer fashion. In this context, each stage 10 of the graphics pipeline is capable of being scheduled separately in a pipelined manner. Shader stages 10 in the pipeline are launched based on the presence of data produced by earlier stages and the availability of output space in fixed-function first-in-first-out storage (FIFOs) feeding later stages. Data marshalling is provided by a very well-defined set of system-provided hardware-based triggers to ensure that data packets flow in an orderly fashion from one shader stage to the next, and that a subsequent stage does not begin working on data until a previous stage is done producing that data. Furthermore, the data marshalling is typically supported by explicit definitions of the number input data attributes a special purpose graphics pipeline hardware stage (e.g., a vertex shader) is consuming and the number of output data attributes it is producing.

In such graphics processing, the memory 11 used in such graphics pipelines to pass data between stages in many (although not all) embodiments comprises on-chip local memory that can be accessed quickly and efficiently. Such a pipelined scheduling approach using on-chip local memory has proven to be very efficient for processing graphics workloads since it avoids using external memory bandwidth and associated memory latency for the orderly, formatted flow of data between pipelined stages.

By way of analogy, multiple batches of laundry are scheduled for washing and drying in a kind of pipeline. The washing machine washes each new incoming load. When the washing machine is finished washing a load, the launderer moves the load to the dryer and starts the dryer, and then moves a fresh load of clothes into the washing machine and starts the washing machine. The dryer thus dries clothes the washing machine has finished washing while the washing machine washes a new load. When the dryer is finished, the launderer empties the dried clothes into a basket or bin for ironing and/or folding, and irons/folds those clothes while the washer and dryer are each processing earlier loads in the overall sequential process. In a modern GPU graphics pipeline, the "launderer" is part of the system and a software developer can simply assume it will provide the necessary data marshalling to ensure orderly data flow and properly scheduled processing through the pipeline. It should be noted though that modern graphics pipelines are not limited to a linear topology, and that defining characteristics of the pipeline architecture relates to the way data is marshalled between successive processing stages rather than any particular topology.

In the early days of GPU design, such fixed-function pipelined graphics processing was generally the only workload a GPU could support, and all other functions were performed in software running on the CPU. The first steps toward GPU programming were modest: making some shaders programmable and enhancing the hardware to support floating point arithmetic. This opened the door for some non-graphics based scientific applications to be performed on GPU graphics pipelined hardware. See e.g., Du et al, "From CUDA to OpenCL: Towards a performance-portable solution for multi-platform GPU programming". Parallel Computing. 38 (8): 391-407 (2012). Graphics APIs such as OpenGL and DirectX were then enhanced to formulate some general-purpose computing functions as graphics primitives. Additionally, more general-purpose computing APIs were then developed. E.g., Tarditi et al, "Accelerator: using data parallelism to program GPUs for general-purpose uses", ACM SIGARCH Computer Architecture News. 34 (5) (2006). NVIDIA's CUDA allowed programmers to ignore the underlying graphical concepts in favor of more common high-performance computing concepts, paving the way for Microsoft's DirectCompute and Apple/Khronos Group's OpenCL. See Du et al. GPU hardware further advanced, providing high performance general-purpose computing on graphics processing units ("GPGPU").

Modern GPU Compute processing thus involves operating in accordance with a general purpose application programming interface (API) such as CUDA, OpenCL and OpenCompute as examples, for general purpose digital computing. These Compute workloads can be other than those defined by a programmable or fixed function graphics pipeline, e.g., to define a set logical Compute stages for processing data that is not directly related to shading pixels in an image. Some example compute operations can include, but are not limited to, physics calculations associated with generating a model for an animation, analyzing large sets of data from the scientific or financial fields, deep learning operations, artificial intelligence, tensor calculations, and pattern recognition.

Presently, unlike the graphics programming model, the GPU compute programming model is built around the notions of data parallel computation and in particular, a flat bulk-synchronous data parallelism (BSP). See e.g., Leslie G. Valiant, A bridging model for parallel computation, Communications of the ACM, Volume 33 Issue 8, August 1990. FIG. 1 shows example GPU compute processing stages 12a, 12b, . . . , 12m on the right-hand side. Each parallel compute processing stage can be defined by the launch of many parallel execution threads for a GPU massively parallel processing architecture to execute. Wide collections of work 12 are launched one at a time and communicate via main or other global memory 13 (see FIG. 2). The collections of work can in one embodiment comprise any general-purpose compute operation(s) or program(s) defined or supported by software, hardware or both.

In such compute models, there is typically a hierarchy of execution for compute workloads. For example, in one embodiment, a "grid" may comprise a collection of thread blocks, each thread block comprising a collection of "warps" (using a textile analogy) that in turn comprise individually executing threads. The organization of a thread block can be used to guarantee that all threads in the thread block will run concurrently, which means they can share data (a scheduling guarantee), communicate with each other and work cooperatively. However, there may not be a guarantee that all thread blocks in a grid will execute concurrently. Rather, depending on available machine resources, one thread block may start execution and run to completion before another thread block is able start. This means there is no guarantee of concurrent execution between the thread blocks within the grid.

Generally speaking, grids and thread blocks do not execute in conventional graphics workloads (although it should be noted that some of these general distinctions may not necessarily apply to certain advanced graphics processing techniques such as mesh shaders as described for example in US20190236827, which bring the compute programming model to the graphics pipeline as threads are used cooperatively to generate compact meshes (meshlets) directly on the chip for consumption by the rasterizer). Furthermore, conventional graphics processing typically has no mechanism to locally share data among particular selected threads with guarantees of concurrency along the lines of the thread block or grid model supported by compute workloads.

As FIG. 2 shows, a shared (e.g., main or global) memory 13 is typically used to pass data between compute operations 12. Individual grids each can read from and write to the global memory 13. However, there is no system-provided data marshalling or any mechanism for communicating data from one grid to the next, other than providing background memory each grid can access. The system does not define or constrain what data is input to a grid or what data is output from a grid. Instead, the compute applications themselves define data input/output, synchronization and all other aspects of data marshalling between grids, e.g., so the results of one grid processing (or at least those particular results on which subsequent processing is dependent) are completed and stored in memory before subsequent grid processing begins.

Such data marshalling relates to how data packets are passed from one compute process 12a to another compute process 12b and handles the various issues relating to communicating a payload from one compute process to another. For example, data marshalling may involve communicating data from a producer to a consumer and making sure the consumer can recognize the data and has a consistent view of the data. Data marshalling may also involve guaranteeing certain functionality and/or handling such as cache coherence and scheduling to enable a consumer compute process to coherently access and operate upon cached data a producer compute process has produced. Data marshalling may or may not involve or require moving or copying the data, depending on the application. Under modern GPU compute APIs, all of this is left to the application. While this provides great flexibility, there are also some disadvantages.

Data marshalling typically involves providing some kind of synchronization from one grid to the next. If each grid is independent of all other grids and can be processed independently, then little or no synchronization is needed. This is a bit like cars on a crowded toll road going through a bank of toll booths, where each car can go through a respective toll booth independently and does not need to wait for any other car. But some compute workloads (e.g., certain graph algorithms, sparse linear algebra, and bioinformatics algorithms among others) exhibit "irregular parallelism", meaning that processing of some consumer grids can depend on processing of one or more producer grids.

Under compute APIs, the application itself is responsible for synchronization between one another to organize the data flow between them. For example, if a consumer grid wants to see and use the data produced by a producer grid, the application is responsible for inserting a barrier, fence or other synchronization event to provide the consumer grid with a consistent view of the data the producer grid produces. See e.g., U.S. patent application Ser. No. 16/712,236 filed Dec. 12, 2019 entitled "High Performance Synchronization Mechanisms For Coordinating Operations On A Computer System", U.S. Pat. Nos. 9,223,578, 9,164,690, and US20140282566, which describe example ways in which grids 12 can synchronize with one another and communicate data through the global memory 13 using heavy-weight synchronization primitives such as barriers or fences. Such fence/barrier synchronization technology can for example provide synchronization requiring a first compute grid to finish writing data to memory before a next compute operation accesses that data. According to the bulk synchronous programming model where synchronization is done in bulk per grid, this usually means that all threads of the producer grid must finish executing and writing their data results to global memory before the consumer grid can begin processing. The resulting suboptimal utilization of GPU processing resources can, depending on the compute workload, result in significant squandered time, decreased performance, decreased bandwidth and wasted power.

Because of these various issues, execution behavior exhibited by the present compute programming model can be inefficient for some types of compute workloads. There have been several attempted improvements in the past to allow applications to express such "irregularly" parallel workloads. For example, NVIDIA introduced CUDA Nested Parallelism with the Kepler architecture, targeting irregular parallelism in HPC applications. See e.g., U.S. Pat. No. 8,180,998; and Zhang et al, "Taming Irregular Applications via Advanced Dynamic Parallelism on GPUs" CF '18 (May 8-10, 2018, Ischia, Italy). Another example project looked at a queue-based programming model for graphics. Intel's Larrabee GPU architecture (which was not released as a product) introduced Ct which had the notion of "braided" parallelism. See e.g., Morris et al, "Kite: Braided Parallelism for Heterogeneous Systems" (Computer Science 2012). All of these attempts saw relatively limited success and didn't necessarily try to capture aspects of graphics pipeline system-provided scheduling and data marshalling for use with compute workloads.

By way of further explanation, suppose one grid is a consumer and another grid is a producer. The producer grid will write data to global memory and the consumer grid will read that data from the global memory. In the current bulk synchronous compute model, these two grids must run serially—with the producer grid fully completing before the consumer grid launches. If the producer grid is large (many threads), a few threads may be stragglers and take a long time to complete. This will result in inefficient utilization of compute resources since the consumer grid must wait until the straggler threads complete before it can launch. The machine occupancy drops as thread of the producer grid gradually exit, resulting in inefficiency as compared to a situation in which all threads in both grids were able to run concurrently. Aspects of the technology herein avoid such inefficiencies and enable continual occupancy such as in typical graphics pipelines that leverage continuous simultaneous producer/consumer to capture the occupancy benefits.

FIG. 3 shows additional expansion-and-contraction support (work amplification and aggregation) of commonly-used GPU pipelined graphics processing. Many GPUs replicate certain shader stages (e.g., tessellation) to enable system-invoked parallel processing of the same stage input data on an as-needed basis to avoid bottlenecks and increase data parallelism—which turns out to be useful for certain kinds of graphics workloads. Such system-invoked functionality has not in the past been available for GPU system scheduler supported compute workloads.

Hence there is a need for a new model that allows for compute workloads to be scheduled in a fashion that captures the scheduling efficiency of the graphics pipeline.

BRIEF DESCRIPTION OF THE DRAWINGS

The following detailed description of exemplary non-limiting illustrative embodiments is to be read in conjunction with the drawings of which:

FIG. 9A shows a more detailed view of graph execution initiation.

DETAILED DESCRIPTION OF EXAMPLE NON-LIMITING EMBODIMENTS

Figure 1:
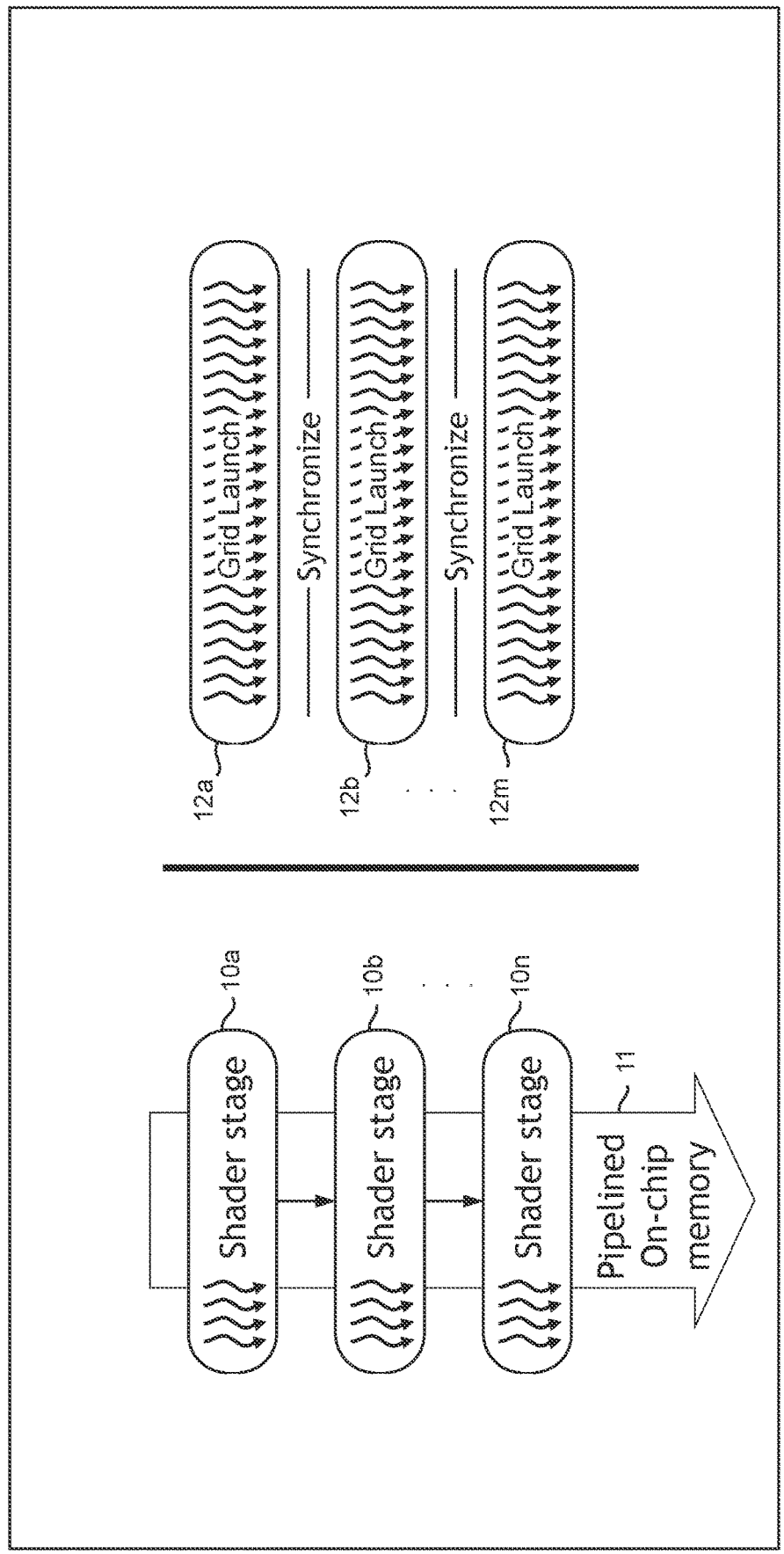
FIG. 1 schematically shows a split personality of a graphics processing unit that performs compute processing and graphics processing.
Figure 2:
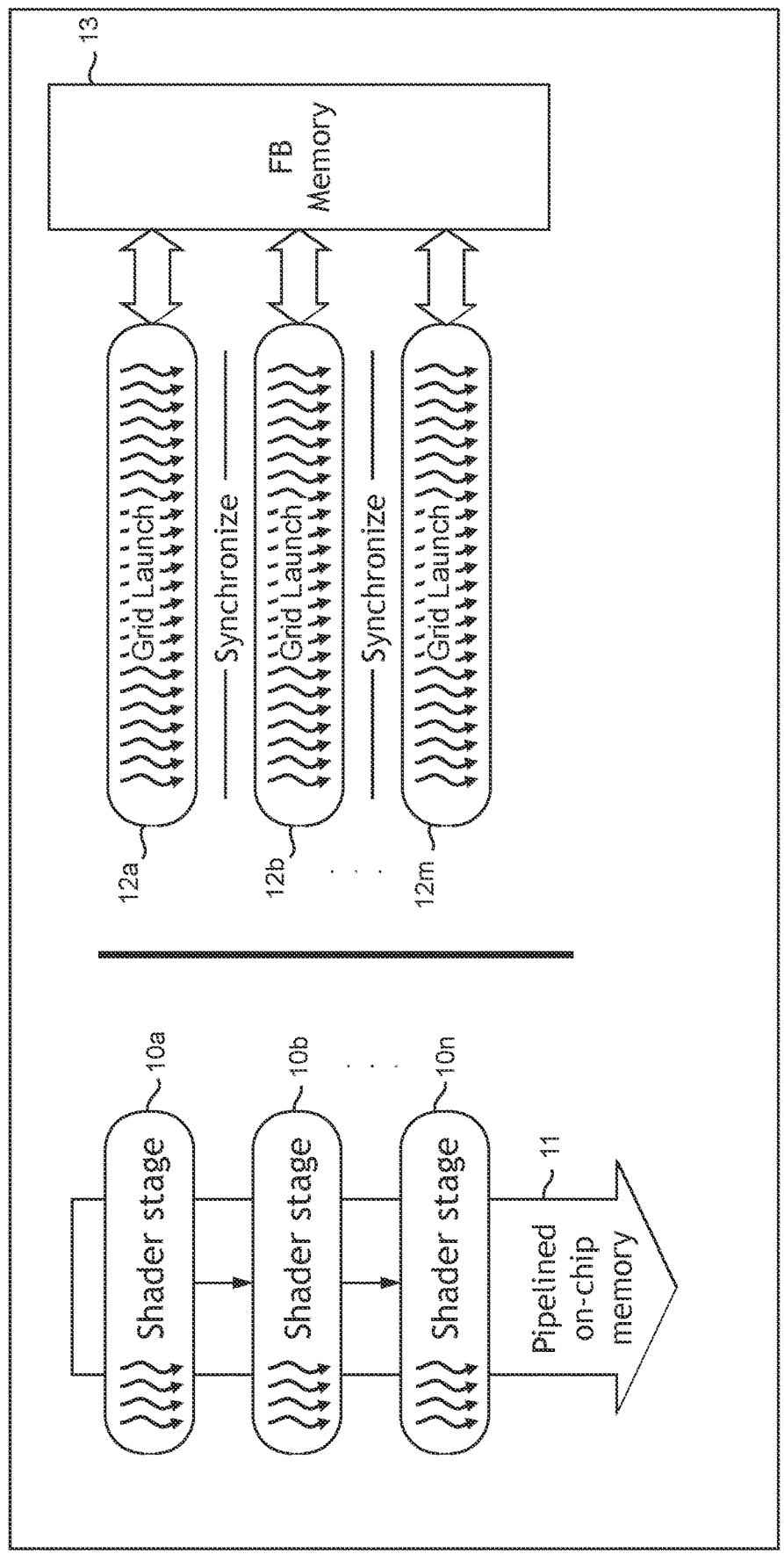
FIG. 2 shows how shader stages can communicate with one another using pipelined on-chip memory and how compute processes can communicate with one another using global memory and synchronization mechanisms.
Figure 3:
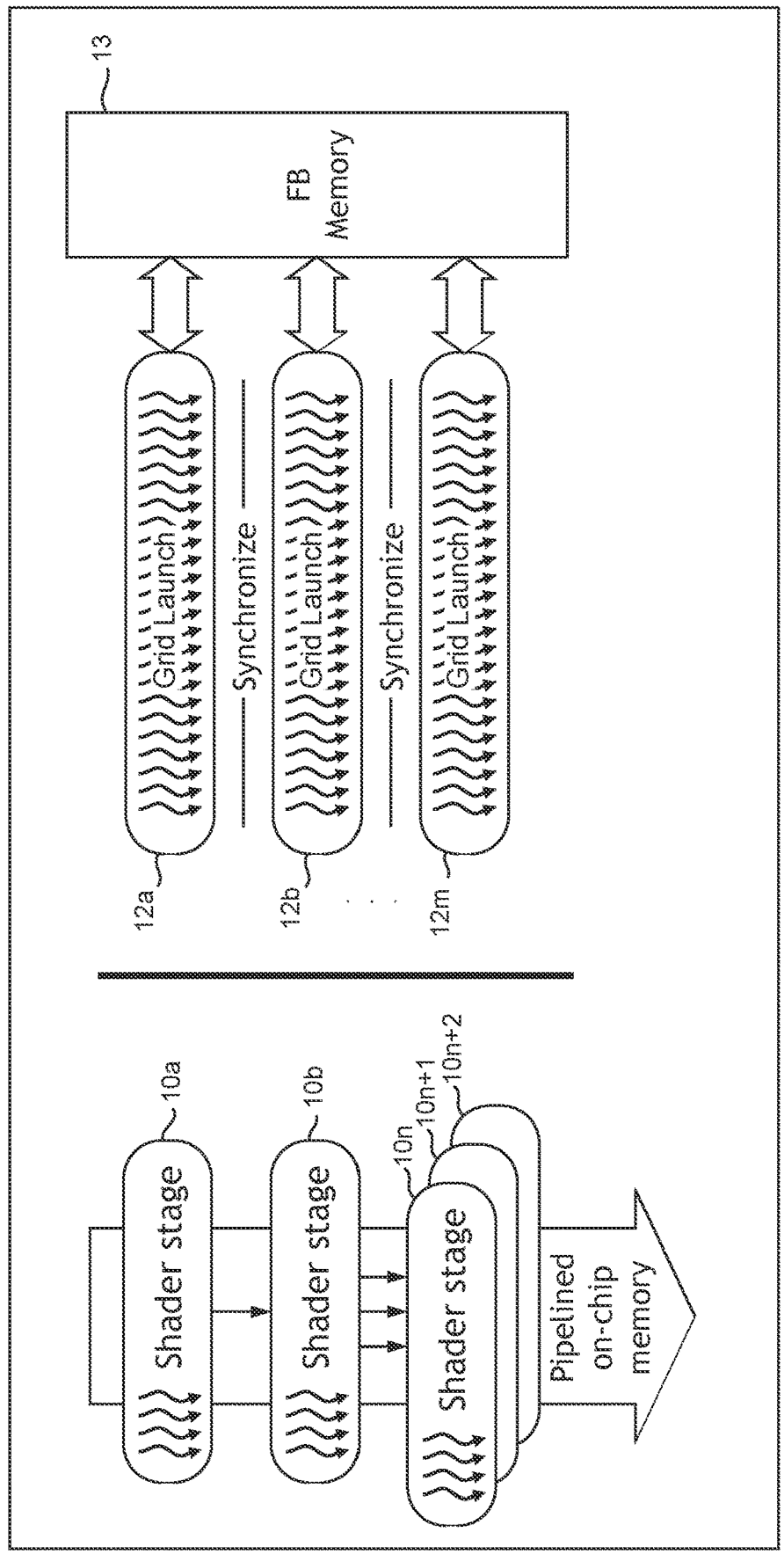
FIG. 3 shows example non-limiting expansion and contraction support for graphics processing with limitations of such support for compute processes.

The present technology augments the compute programming model to provide some of the system-provided data marshalling characteristics of graphics pipelining to increase efficiency and reduce overhead. In particular, technology herein allows programmers/developers to create pipelines of compute kernels in ways that are not possible using presently available GPU compute APIs.

Example non-limiting embodiments provide a simple scheduling model which is based on scalar counters (e.g., semaphores) abstracting the availability of hardware resources. In one embodiment, a system scheduler responsible for launching new work reserves/acquires resources (either "free" space or "ready" work items) by decrementing a corresponding semaphore, and user's code (i.e., the application) releases resources (consumers: by adding back to the "free" pool of the resource they are reading from, producers: by adding back to the "ready" pool of the resource they are writing to) by incrementing the corresponding semaphore. In such an example non-limiting arrangement, reservation/acquisition can always done conservatively by the scheduler decrementing the semaphores, and resource release is always done by the user's (application) code since it determines when it is appropriate to perform the release, and it's always done by incrementing the semaphores. In such embodiments, resource releases can thus be done programmatically, and a system scheduler only needs to track the states of such counters/semaphores to make work launch decisions (fallback provisions may be provided so the scheduler can increment the semaphores and thereby release resources if the user or application software fails to do this as its supposed to). Release of resources does not have to be done by the user's application, it can be implemented by some system software, for example, which can ensure that all proper accounting is done. Semantics of the counters/semaphores in one embodiment are defined by an application, which can use the counters/semaphores to represent, for example, the availability of free space in a memory buffer, the amount of cache pressure induced by the data flow in the network, or the presence of work items to be processed. In that sense, our approach is a "resource-constrained" scheduling model.

One novel aspect of this approach is that an application is given the flexibility of organizing custom data marshalling between nodes in the network, using efficient lock-free algorithms using queues or other data structures of the application's choice. By decoupling the management of hardware counters/semaphores driving the scheduling decisions from the management of such data structures, we enable a framework for expressing work amplification and aggregation—which are helpful aspects of the graphics pipeline scheduling and are useful for efficient processing of workloads (such as compute workloads) with varying amounts of data parallelism. A resource reservation system is provided that allocates resources at time of launch to guarantee the thread blocks can run to completion, thus avoiding deadlocking and avoiding the need for expensive context switching. The resource reservation system is relatively simple and does not need to scale or grow with the number of work items or the number of concurrently executing thread groups from the same task/node. For example, in one embodiment during such scheduling for any particular task, the scheduler looks at only two counters SF and SR per resource (there will or may be multiple such pairs of counters when there are multiple resources/stages in the pipeline)—which has some implications concerning the kinds of execution node graphs that can be constructed. In an example embodiment, the semaphores themselves are not considered to be part of the scheduler but rather are provided by the hardware platform to support the scheduler. Thus, the scheduler and the applications can each manipulate the semaphores in certain ways, and the scheduler can monitor the manipulation of the semaphores by the applications.

A further aspect relates to adapting the expansion/contraction support of the graphics pipeline to make such concepts useful for compute workloads—providing dynamic parallelism.

Previous attempts at scheduling compute workloads exhibiting irregular parallelism generally did not try to directly incorporate the notion of backpressure in a producer-consumer data flow, which is helpful for efficient scheduling and allows for the data flow to stay on-chip. Backpressure—the ability of a consumer to slow down a producer to prevent the consumer from being overwhelmed by the data stream the producer is producing—allows for efficiently streaming large amounts of data through buffers of fixed size. Being able to allocate fixed size buffers smaller than the potential number of work items which will be streamed through them is highly desirable because physical memory is a limited resource and shared with many other parts of the application. Graphics pipelines often support such backpressure scheduling, See e.g., Jonathan Ragan-Kelley, Keeping Many Cores Busy: Scheduling the Graphics Pipeline, Beyond Programmable Shading II (SIGGRAPH Thursday, 29 Jul. 2010); Kubisch, GPU-Driven Rendering (NVIDIA, GTC Silicon Valley Apr. 4, 2016); Node US, "Backpressuring in Streams", https://nodejs.org/en/docs/guides/backpressuring-in-streams/. An alternative would be allocating a sufficiently large buffer between producer and consumer to accommodate the "worst case," but parallelism of the machine only permits a fraction of such "worst case" allocation being active at one time—the rest of the worst-case memory allocation will be wasted or idle. Backpressure scheduling allows for efficiently using fixed-size memory allocations, minimizing waste.

The example non-limiting approach can also explicitly avoid the need for context switching any in-flight work. For example, in a modern GPU, the amount of state that needs to be saved and restored for context switching may be too large for it to be practical in high-performance environments. By making the scheduler directly aware of the resource constraints imposed in a chip, such as the amount of on-chip buffering available, our approach enables the overall system to stream through the workload while minimizing the amount of external memory bandwidth required to communicate transient data.

As we expand the scope of applications processed by a processor such as a GPU to novel domains like machine learning and ray tracing, the present approach will help to advance the core programming model used to tackle efficiently such workloads, including those exhibiting irregular parallelism. In particular, example features of our model allow for the reduction and/or complete elimination of external memory traffic when scheduling complex compute workloads, providing a path to scaling performance beyond the bandwidth limit of external memory.

Another aspect comprises an API (application programming interface) that supports this technology. Such API can exist across a number of different hardware platforms, and developers can use such an API to develop applications.

Still another aspect comprises the advantageous use of memory caching to capture the data flow between compute stages in faster memory, thereby using on-chip memory for communicating data between stages of a graphics pipeline. This allows implementations to optimize by leveraging on-chip memory, thereby avoiding expensive global (e.g., frame buffer) off-chip memory operations by pipelining the compute data flow, increasing bandwidth and computation power.

Still another aspect involves data marshalling that schedules the work in finer grain. Rather than launching all threads in the grid or other collection of threads at the same time and waiting for them all to complete, we can launch selected threads or groups of threads in a pipelined manner—thereby enabling fine grain synchronization by not synchronizing in bulk. This means we can run producers and consumers concurrently—just as in a pipelined model.

Example Non-Limiting Scheduling Model

Figure 4:
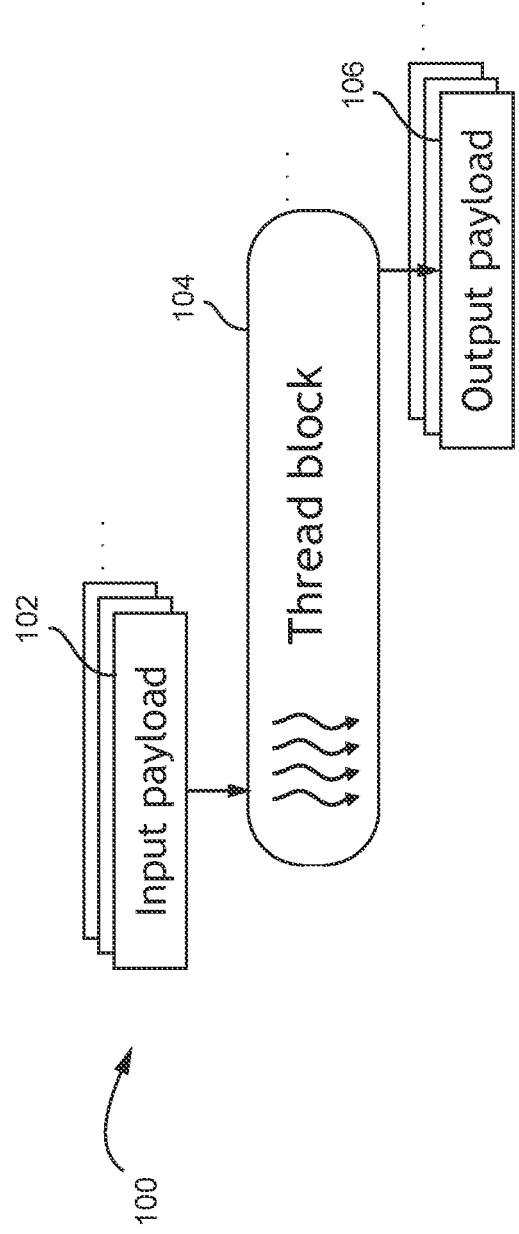
FIG. 4 shows an example non-limiting scheduling model.

FIG. 4 schematically shows an example non-limiting scheduling model 100 showing a fundamental unit of scheduling. In the scheduling model 100 shown, an input payload 102 is provided to a thread block 104, which generates an output payload 106. One of the features of the scheduling model 100 is a system-defined programming model providing explicit definitions for an input payload(s) to the thread block 104 and an output payload(s) from the thread block. In one embodiment, the explicit definition of the payloads 102, 106 define the sizes of the data packets.

For example, the definition can be in accordance with a general program model that includes an explicit system declaration that thread block 104 will consume N bytes of input payload 102 and produce output M bytes of output payload 106. The thread block 104 (and not the system in one embodiment) will be concerned about the meaning, interpretation and/or structure of the input and output data payloads 102, 104 and how much data the thread block is actually reading from its input payload 102 and writing to its output payload 106 for each invocation of the thread block. The system in one embodiment on the other hand does know, in accordance with the scheduling model, that input payload 102 is for input by thread block 104 and the size of that (opaque to the system) input data payload, and similarly that output payload 106 is for output by that thread block and the size of that (opaque to the system) output data payload. Such explicit declarations of input and output correlations are present for each thread block 104 with its respective input payload 102 and respective output payload 106.

Figure 5:
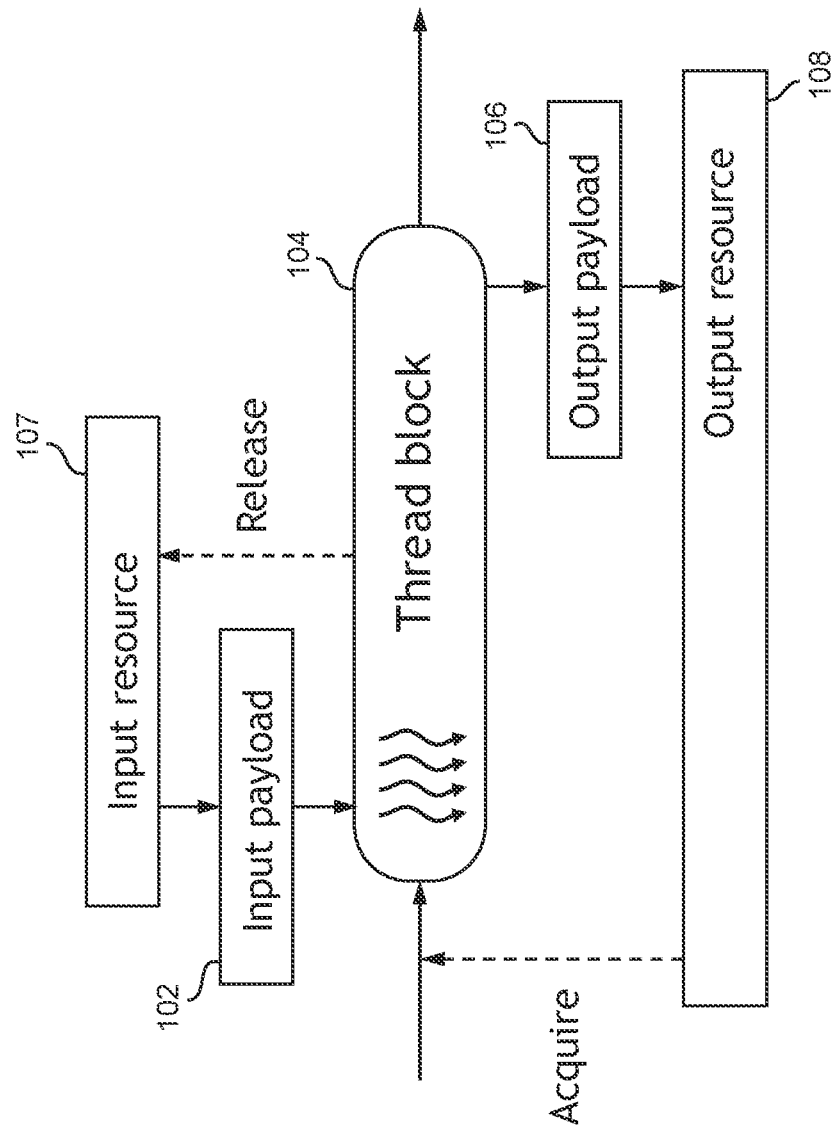
FIG. 5 shows an example non-limiting scheduling model using launch-guaranteed resources.

FIG. 5 shows that such definitions are used in one embodiment to enable the system to schedule thread blocks 104 in a very efficient pipeline. Well-defined input and output allows synchronization at object scope and relieves the need for synchronizing unrelated work. Such well-defined input and output declarations increase occupancy and enable resources to be acquired conservatively prior to kernel launch (as indicated by the "acquire" arrow) and programmatically released prior to completion of execution (as indicated by the "release" arrow). FIG. 5 shows that in one embodiment, the scheduler performs resource acquisition (i.e., decrementing the $S_F$ semaphore by some known amount predeclared by the thread block to reflect the size of the output payloads, to thereby reserve the needed amount of the resource for the thread block) before thread block launch, whereas the thread block (application) itself may programmatically release the resource after it is finished with it and before it is finished executing, with the scheduler noting and tracking such release by an appropriate amount which can be calculated programmatically—to provide a deadlock-free guarantee, avoid the need for context switching and enabling additional flexibility. In one embodiment, release can be performed anywhere within the program flow and can be performed incrementally at different times for a given thread block to enable the thread block to reduce its resource reservation when it no longer needs as much of the resource. In such embodiments, like a group of diners who have finished their restaurant meal and leave their table, it is up to the thread block to decide when to release the resource; the system-based scheduler will recognize and exploit the release by reserving the released amount. The aggregate action of how much of a resource has been acquired and how much of the resource has been released should be consistent to ensure that everything acquired is eventually released, avoiding cumulative error and associated deadlock and cessation of forward progress. However, in one embodiment, when and how the resources are acquired and released can be determined programmatically by the thread block but monitored, enforced and exploited by the system-based scheduler.

FIG. 5 for example shows some abstract input resources 107 and output resources 108 (e.g., on-chip memory, a main memory allocation the system uses to implement data marshalling for the thread block 104, hardware resources, computation resources, network bandwidth, etc.) In one embodiment, the size/extent of such input and output resource 107, 108 allocations are fixed, i.e., some finite number of bytes in the case of memory allocations. Because the system knows the sizes of the inputs and the outputs 102, 106 of each individual thread block 104, it can calculate how many thread blocks can be run in parallel and schedule launches of thread blocks based on whether they are producers or consumers. For example, if two thread blocks 104a, 104b participate in some kind of producer/consumer relationship, the system can schedule the producer and know which output resource 108 the producer will use and can then schedule the consumer thread block sourcing from that output resource. By knowing the sizes of the input payload 120 and output payload 106, the system can schedule the pipeline correctly using optimal resource-constrained scheduling. See e.g., Somasundaram et al, Node Allocation In Grid Computing Using Optimal Resource Constraint (ORC) Scheduling, IJCSNS International Journal of Computer Science and Network Security, VOL. 8 No. 6 (June 2008).

While the most common parameter relating to amounts of input and output resource 107, 108 will be memory size, the embodiments are not so limited. The input and output resources 107, 108 can be for example network bandwidth, communication bus bandwidth, computation cycles, hardware allocations, execution priority, access to input or output devices such as sensors or displays, or any other shared system resource. As an example, if multiple thread blocks 104 need to share a limited amount of network bandwidth, a similar resource-constrained scheduling can apply with respect to network bandwidth as the resource constraint. Each thread collection or block 104 would declare how much bandwidth it uses per invocation, thereby enabling the system to schedule within the bandwidth constraint. In such instances, a value or other metric would be used to specify amount of network bandwidth required (i.e., how much of the network bandwidth resource will be occupied by the thread block upon invocation). The amount of parallelism the GPU can support will be a function of how big the resources needed to support the thread block 104 are. Once the system knows the sizes/amounts of the resources needed, the system can optimally schedule the compute pipeline including which thread blocks 104 will run concurrently and allocate the input/output resources before the producers and consumers launch. In one embodiment, before a thread block is launched, the system enables it to acquire space in the output resource 108 and tracks utilization accordingly. Such system operations in one example non-limiting embodiment are performed by programmable hardware circuitry (e.g., hardware counters and associated logic gates implementing sets or pools of free and release counter/semaphore pairs) for speed and efficiency. Such programmable hardware circuitry can be programmed by system software and by applications running on the system, using conventional API calls.

Figure 6:
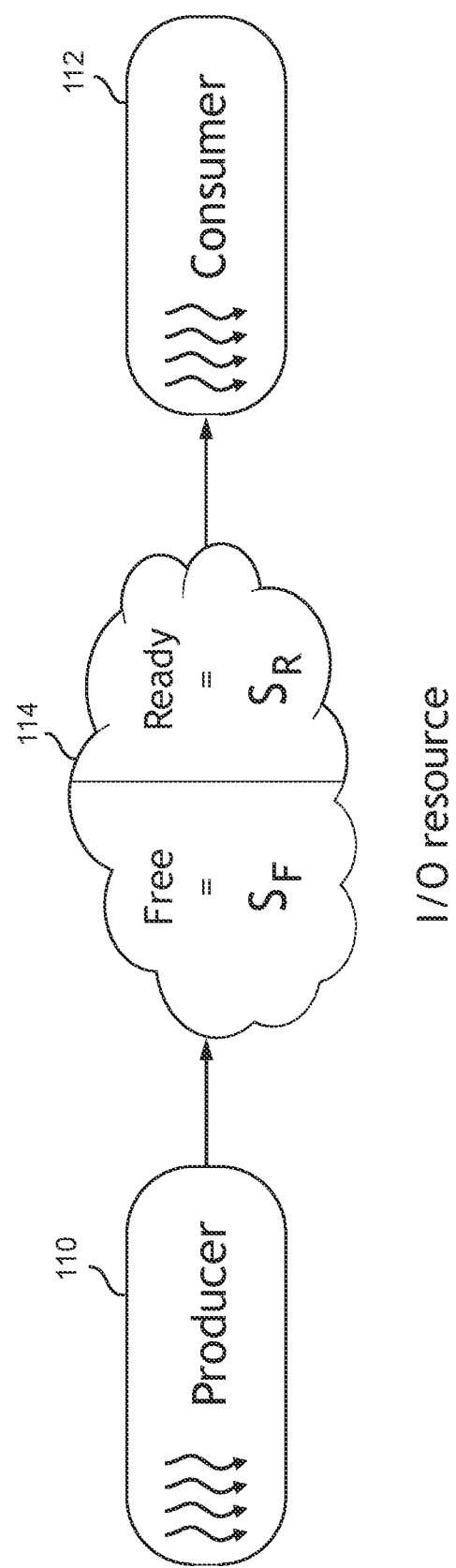
FIG. 6 shows an example resource-constrained scheduling between a producer and a consumer.

FIG. 6 shows an example view of resource-constrained scheduling using semaphores $S_F$ and $S_R$ indicating free and ready capacities of a constrained resource. $S_F$ may indicate the total capacity of the resource and $S_R$ may indicate how much resource capacity has already been allocated or otherwise called for. Knowing what those values are, the system can calculate or otherwise determine how many (and which)

thread blocks to launch in order to avoid overloading the resource and in some embodiments to optimize resource utilization.

A producer 110 and a consumer 112 are shown connected through a resource 114. The resource 114 may be a software construct, such as a queue. Each kernel defines a fixed-sized input and output—synchronization is at the object scope. In more detail, each kernel technically defines a maximum input or output; producers can choose to produce up to this amount. Consumers might be (in coalescing launch cases) launched with fewer than the maximum number of work-items. The system may assume that the producer 110 and consumer 112 will always run to completion, and the system's hardware and/or software scheduling mechanism can monitor system operations, and based on the monitoring, maintain, update and look at $S_F$ and $S_R$ to determine how many thread blocks to launch. In one embodiment, the system uses the semaphores to guarantee that the input/output resources will be available when concurrently-executing processes need those resource, thereby ensuring that the processes can run to completion instead of the processes deadlocking, having to be preempted or stalled and required to wait until the resources become available, or requiring expensive context-switching with associated overhead.

In one implementation, a system-based hardware and/or software scheduling agent, mechanism or process operates in the background independently of consumers and producers. The scheduling agent, mechanism or process looks at semaphores $S_F$ and $S_R$ to decide how many producers and consumers the system can launch at a given time step. For example, the scheduling agent, mechanism or process can determine to launch producers only if there is free space available, and determines how many producers can be launched based on the value of free space semaphore $S_F$. The scheduling agent, mechanism or process similarly determines based on the ready semaphore $S_R$ the number of valid consumer entries for the constrained resource. The scheduling agent, mechanism or process updates the semaphores whenever new thread blocks are launched and also monitors state changes whenever thread blocks update the semaphores before they complete and terminate.

In many implementations, multiple producers and consumers will be running concurrently. In such cases, because the input/output resources are acquired when the producers and consumers launch, the input/output resource(s) will not be cleanly divided into occupied space and non-occupied space. Instead, there will be a fraction of that resource in intermediate space. For example, producers that have just started running have not yet produced valid output, so the ready semaphore $S_R$ will not register the producer's output as valid data and the semaphore's value will be less than the amount of memory space the producer will eventually require when it does output valid data. In one embodiment, only when the data output by the producer becomes valid will the producer account for this actual data usage by incrementing ready semaphore $S_R$. Example embodiments use two semaphores $S_F$ and $S_R$ to account for these temporal sequence of events connected with concurrent processing and resource acquisition at launch time. For example, before launching a thread block, the system reserves output space that will be needed by the thread block in the I/O resource 114, thereby guaranteeing the space will be available when it is needed and avoiding deadlocked conditions that can result by acquiring the resource later during execution. It tracks this resource reservation by borrowing from the free semaphore $S_F$. Once the thread block launches and begins to populate or otherwise use the resource, the amount of the resource being used is moved to the ready state—which is tracked by updating semaphore $S_R$. Allocating resources before launch not only avoids potential deadlocks, it also has the benefit of being able to use algorithms which do not need to handle the possibility of resources being unavailable. This potentially large simplification to the allocation phase of data marshalling algorithms is a benefit.

Similar analysis applies to the consumer side of resource allocation. Before the system launches a consumer thread block, it checks the ready semaphore $S_R$ to ensure it is non-zero. When the system launches the consumer thread block, it tracks that the consumer will consume the resource in the future but has not yet done so by decrementing the ready semaphore $S_R$. Only after the consumer has consumed the reserved resource can the system state transition the resource to free space, release the resources associated with the work item (which in example embodiments is done by the consumer itself), and increment the free space semaphore $S_F$. After being reserved and before it is released, the work item exists in an undetermined state.

In one embodiment, the scheduling agent, mechanism or process can be simple because it is tracking resources using two semaphores as discussed above. In example implementations, the semaphores $S_F$, $S_R$ can be implemented by a collection of hardware circuitry such as registers and/or counters that are cheap to maintain, update and use. At every cycle or at other periodic or non-periodic frequency, the system updates the registers/counters through simple and inexpensive hardware-based updates (e.g., increments and decrements, adding or subtracting integer values to/from them, or the like) to account for resource consumption. Furthermore, such implementations can be mapped straightforwardly onto legacy GPU scheduling implementations (which due to the simplicity of the current scheduling techniques does not require all of the complexity of the legacy scheduler), so that additional hardware design is not required. In other implementations, additional simplified hardware circuits dedicated to the current scheduler can be provided, achieving reduced chip area and power requirements. Because the current scheduler can be implemented in an abstracted manner around simple counters that track resource utilization, a simple scheduler can be implemented. The semaphore values can be updated via hardware or software mechanisms. If software instructions are used, the instructions can be embodied in system code or application code. In one embodiment, signals to request and release resource reservations are provided by the producer and consumer thread blocks themselves. In addition, the increase/decrease of $S_F$ and $S_R$ can be performed programmatically in response to the request and release signals from the producers and consumers in order to exploit early resource release. Even though SF and SR can be considered to be part of the scheduler, which ultimately controls these values, higher-level system components can in addition ensure that poorly behaved producers and consumers cannot hog resources or stop forward progress.

Enough such registers are provided to support the maximum number of tasks needed for concurrent processing, i.e., to represent the number of states needed to support all the consumers and producers that may be launched concurrently. In one embodiment, this means that a pair of semaphores is provided for each concurrently-executing thread blocks or applications. The scheduler can launch any number of concurrent consumer and producer nodes in a streamlined fashion and the amount of state the scheduler needs to maintain to track resource reservation and usage does not depend on the number of concurrently executing thread groups from the same task/node. Rather, the amount of state the scheduler maintains for a given node in one embodiment does not grow with and is thus not dependent on the number of queued work items or tasks (e.g., threads) waiting to be executed. The number of states the scheduler maintains will grow with the number of resources to be allocated, and with the number of shader programs (tasks) active in the system, which in a pipelined scheduling model will depend on the number of stages in the pipeline—since the output resource of one stage will generally comprise the input resource of a succeeding stage in the pipeline. In one embodiment, the scheduler maintains one register per "resource" (e.g., memory, cache, etc.) to represent $S_F$ and one register per "task" to represent $S_R$.

The technology herein is not however limited to creating pipelines, but instead can support more complicated relationships and dependencies. The amount of state the scheduler needs to maintain will in such cases depend on the topology of the graph of nodes it is charged with scheduling for concurrent execution. As discussed above, because in some implementations the scheduler is designed to be simple and efficient based on just two values $S_F$, $S_R$ per resource as described above, graphs of arbitrary complexity/topology may not be supported, and another scheduling algorithm/arrangement may be invoked in contexts where such flexibility is required at the expense of increased scheduling complexity.

Furthermore, in cases where the resource being allocated is memory, the scheduler is not limited to any memory type but rather can be used with many different memory structures such as linear memory buffers, stacks, associative caches, and many more.

Because the number of states the example embodiment scheduler maintains is of fixed size in order to keep the scheduler simple, a phenomenon we call backpressure results. First, in example embodiments, the fixed size constraint may imply the use of only a pair of semaphores $S_F$, $S_R$ per resource to control assignment and release of resources and thus system concurrency. In one embodiment, there are only two values per resource so the amount of state the scheduler maintains does not grow with the nature of the graph of the execution node topology the scheduler is called upon to schedule. In example embodiments, there is a pair of such semaphores per resource, and in a graph with multiple nodes and queues connecting them, there will be a pair of semaphores per queue. Upon initialization of these values $S_F$, $S_R$ at the beginning of system execution, they are initialized to the amount of resources that are available to those particular stages of the pipeline or graph topology. The semaphores $S_F$, $S_R$ then change (increase and decrease) as work is scheduled.

As a resource runs out, the particular node that requires that resource will stop being scheduled and some other node will start execution because it has available resources and inputs.

In one embodiment, when work is launched, the free and ready semaphores $S_F$, $S_R$ get modified atomically with that work log. For example, launching work will decrement the free semaphore $S_F$ atomically, thereby preventing other work from launching under the mistaken view that there are additional resources available when in fact those resources have already been reserved. This would be little like a maitre d' keeping tracking the number of restaurant patrons already in the bar having a drink before being seated to ensure that available tables are assigned to them instead of to newly arrived patrons. This avoids the possibility of a race. Similarly, the scheduler atomically decrements the free semaphore $S_F$ in order to allocate resources to a producer. Furthermore, the application can use the semaphores to release resources before completion of work in some embodiments. Thus, in example non-limiting embodiments, resource reservation is done by a scheduler, but resource release is done by the application/user code.

Figure 7:
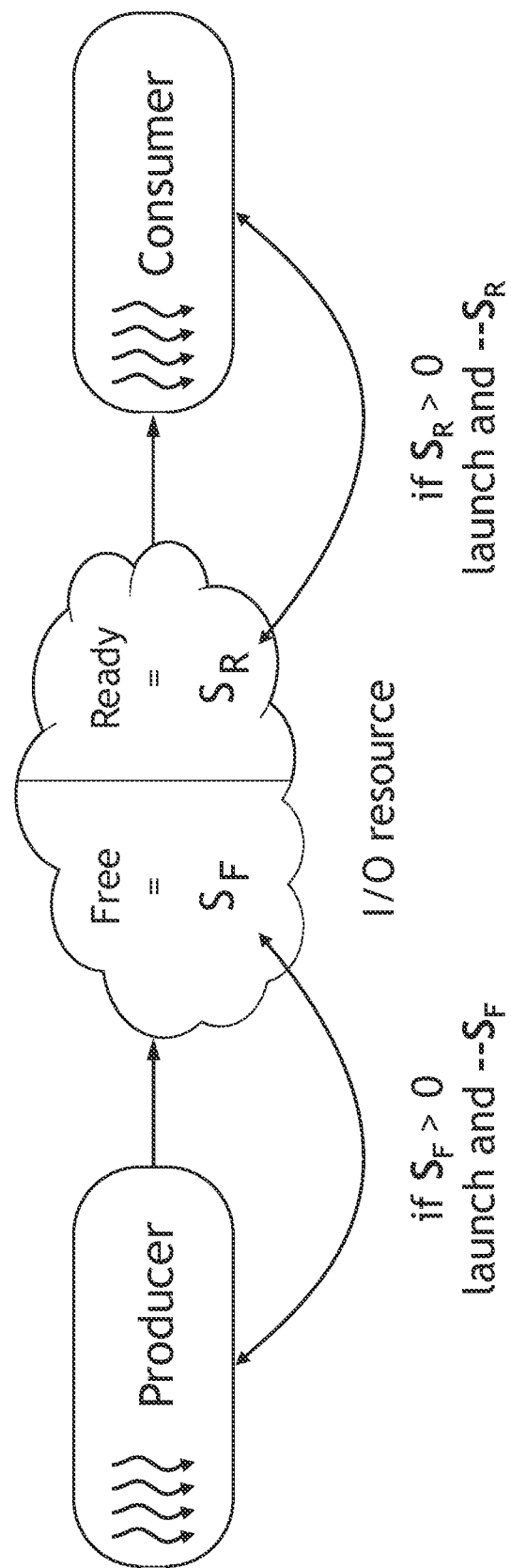
FIG. 7 shows the example FIG. 6 resource-constrained scheduling using launch thresholds.
Figure 8:
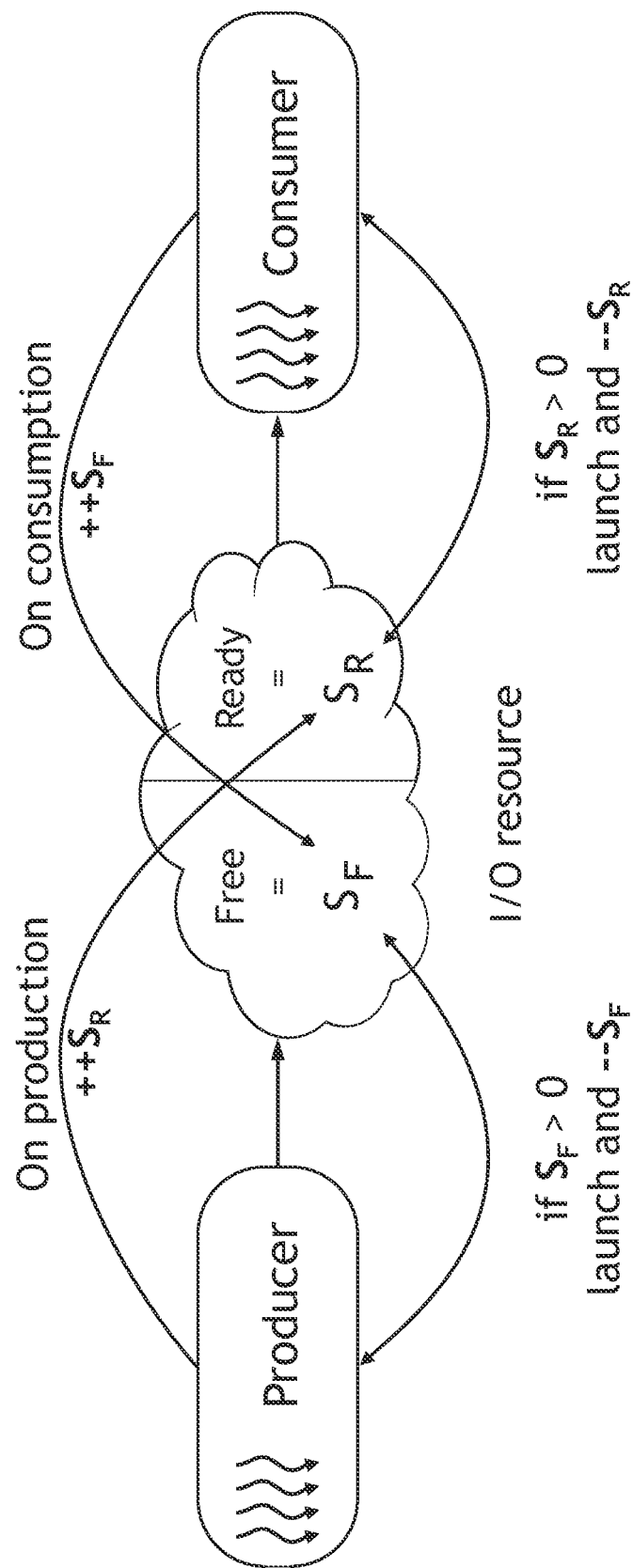
FIG. 8 shows the FIG. 6 example resource-constrained scheduling including on production and on consumption feedback.
Figure 13:
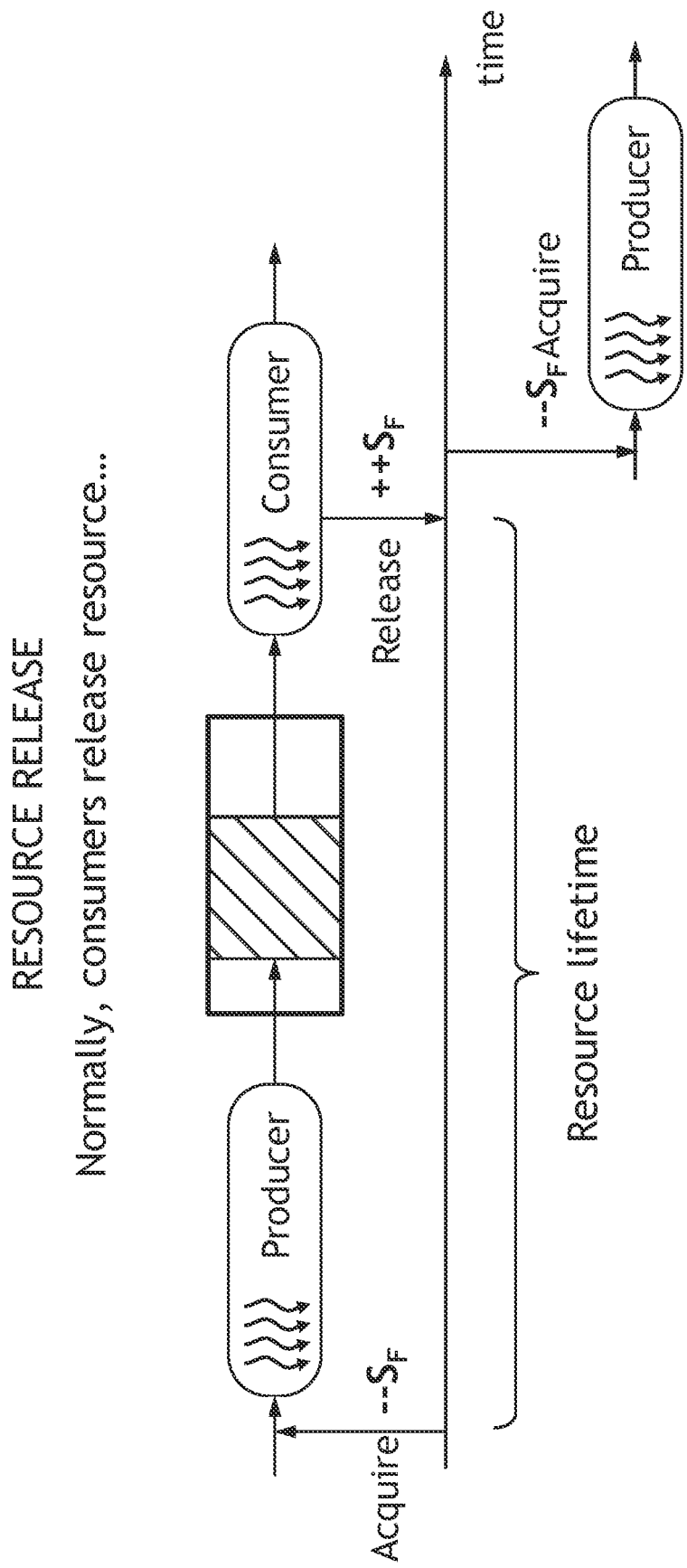
FIG. 13 shows an example non-limiting resource release.

FIGS. 7 & 8 together show an example of one-to-one mapping between resource acquire events and resource release events. Time goes from left to right. Assume the resource is a buffer in memory. As FIG. 7 shows, upon acquisition, $S_F$ is subtracted from ("$-S_F$") by an amount declared by an explicit definition from the producer thread block to indicate that that fraction or amount of the memory is being reserved for use. FIG. 8 shows that the producer thread block will increment $S_R$ at some point in its lifetime to indicate that the producer thread block is actually now using the resource to store valid data. Since the data needed by the consumer thread block is now valid, the scheduler can launch the consumer thread block. The scheduler will also decrement $S_R$ when launching the consumer—completing the symmetry between the two semaphores and producer/consumer tasks. At some point during its execution, once the consumer consumes the resource, it can indicate back to the system that it no longer needs that resource. The system thus transitions the resource to free space in response to a release event performed by the application/consumer code, by adding to the $S_F$ value, which means the scheduler can now launch an additional producer(s). As shown in FIG. 13, the scheduler will not launch that further producer until the previously launched producer releases the memory reserved for it; the next acquire therefore can come only after the scheduler increases the $S_F$ value to indicate that amount of resource is now available for re-acquisition. Concurrency in the system is limited by resource utilization lifetime as a result.

Figure 9:
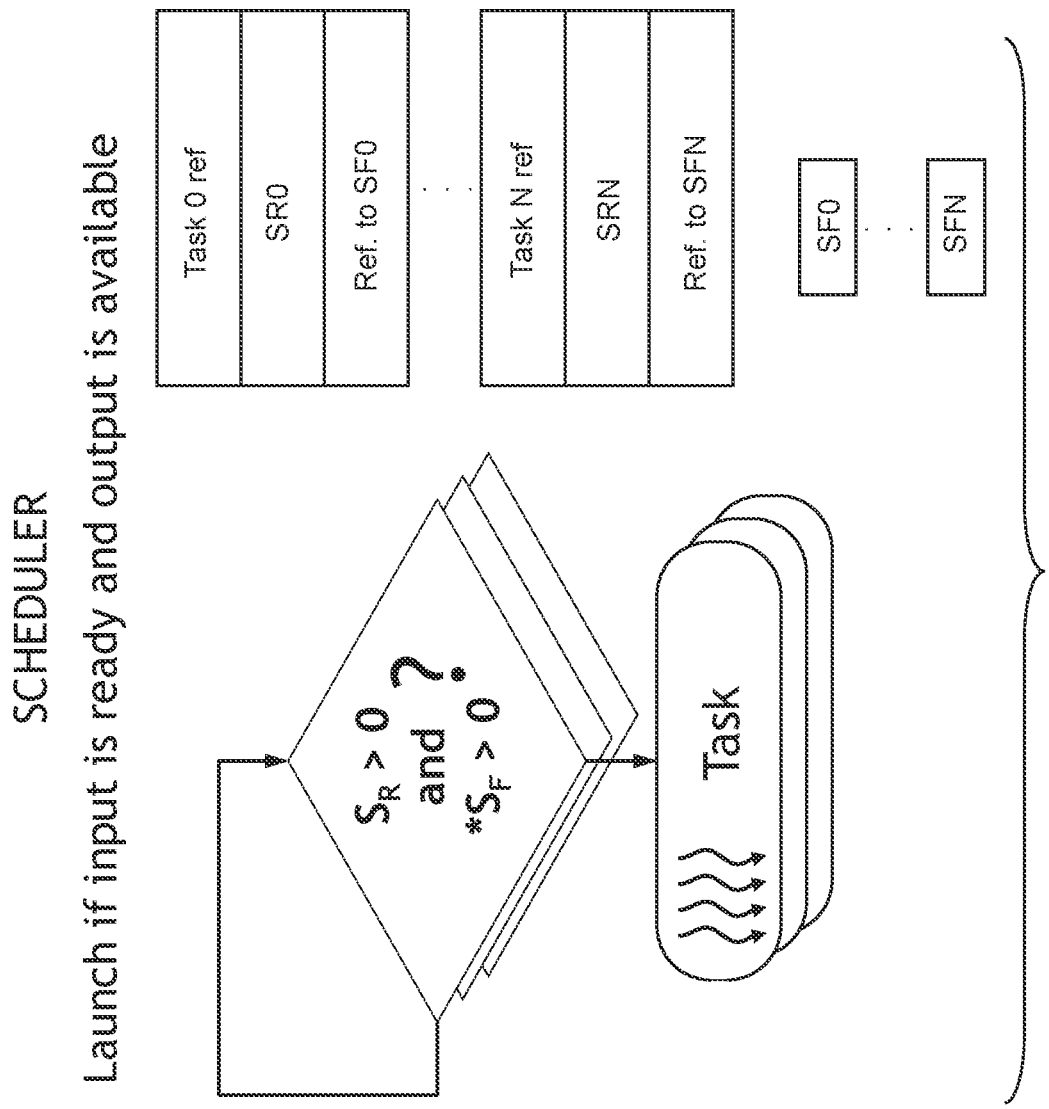
FIG. 9 shows an example non-limiting scheduler that operates to launch if input is ready and output is available.

FIG. 9 is a flowchart of an example scheduler view of operations that initiates launch of a thread block conditioned on whether the input is ready and the output is available, as indicated by $S_R>0$ and $S_F>0$. Such functionality can be implemented in hardware in one embodiment. Multiple sets of hardware circuitry registers may be provided, with each register set corresponding to a task. As shown on the right of FIG. 9, each register set (which may be termed a "task descriptor") contains for example:

a reference to a task (e.g., a name or address that can be used to invoke an instance of the task);

an $S_R$ semaphore (which is uniquely associated with the task); and a reference to at least one $S_F$ semaphore (*$S_F$) (some embodiments allow multiple task free semaphore references to refer to a common free semaphore $S_F$; other embodiments could also store the free semaphore by value with the task identifier rather than by reference).

Multiple tasks can refer to the same semaphore(s), which is how implicit dependencies between tasks can be implemented.

Every time unit or clock, the scheduler will look at these semaphores and compare them with zero. If the semaphores for a task are both greater than zero, the scheduler determines it can launch the task and does so, decrementing the task's $S_F$ semaphore at launch. When the task is finished using the resource, the task itself (in one embodiment) causes the hardware to increment the $S_F$ and $S_R$ semaphores by using a mechanism to identify which semaphores to increment. In the case of the ready semaphore, the task can send an increment signal to the task entry associated with the task. In the case of the free semaphore, software will send an increment signal with an index into the table of free semaphores. Software can refer to the semaphores by name and command them by name to increment. As will be understood, the "increment" and "decrement" signals or commands may actually command increase (addition) or decrease (subtraction) by any integer within a range.

At the software API level, objects that may be defined or declared by a developer or application programmer and serviced by system software include:
  at least one queue object, and
  a task object that refers to both code to run and the queue object to use.

The system will then map the queues to semaphores and the tasks to hardware task descriptors.

An application program will first specify the graph, i.e. the topology of task nodes to be executed and their dependencies. In response to such specification, the system software will create the queues and initialize the hardware and the system. When the application triggers execution of the graph, the GPU system software invokes the root task(s) of the graph and begins executing the graph in an autonomous manner that is decoupled from the CPU. See FIG. 9A. The system can determine a graph is done when all queues are drained and the graph execution is idle. An alternative could use a system-interpreted token to explicitly indicate end of work. FIG. 9A shows three alternative ways for resources to be released: Option 1) End of work token to propagate through pipeline to designate work done; Option 2) Wait for queues to become empty and any actively executing nodes to stop running; Option 3) User code in task determines when done and signals (the most common scenario in example embodiments).

Figure 10:
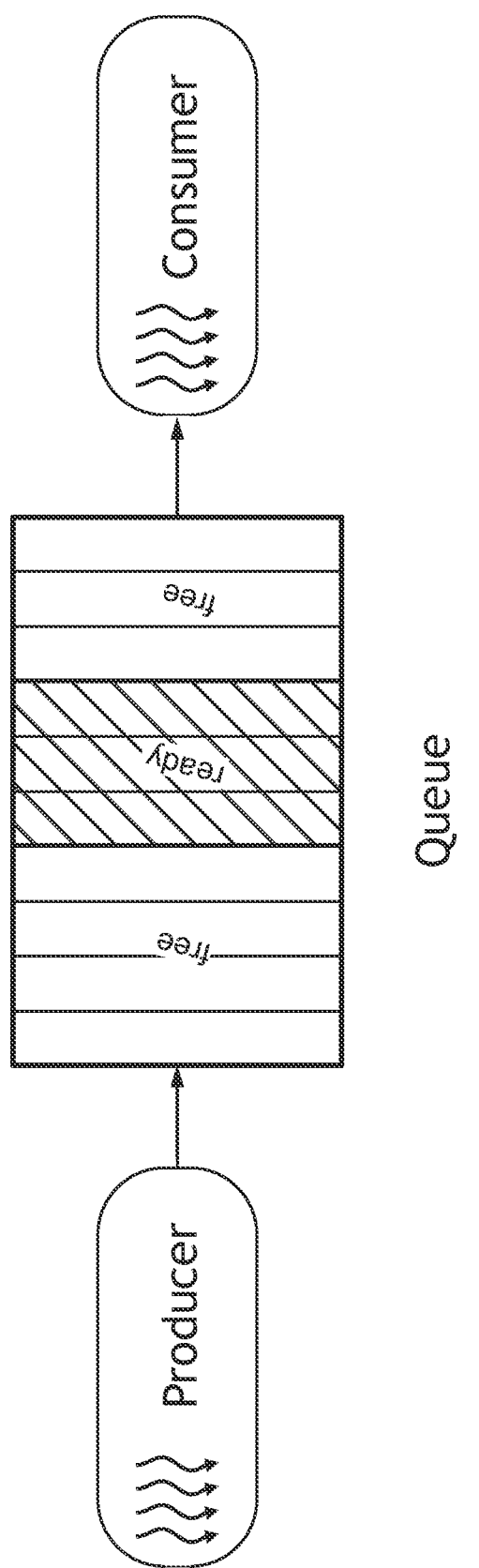
FIG. 10 shows a resource-constrained scheduling using queues.

FIG. 10 shows example resource-constrained scheduling using a queue. As mentioned above, the resource can be anything including any kind of memory structure, but often it will be advantageous to use a queue to pass data from a producer to a consumer—which is similar to the model that is often used in graphics pipelines. In some embodiments, the semaphores and test logic are implemented in hardware circuitry whereas the queue is a software construct and is managed by system software.

Figure 11:
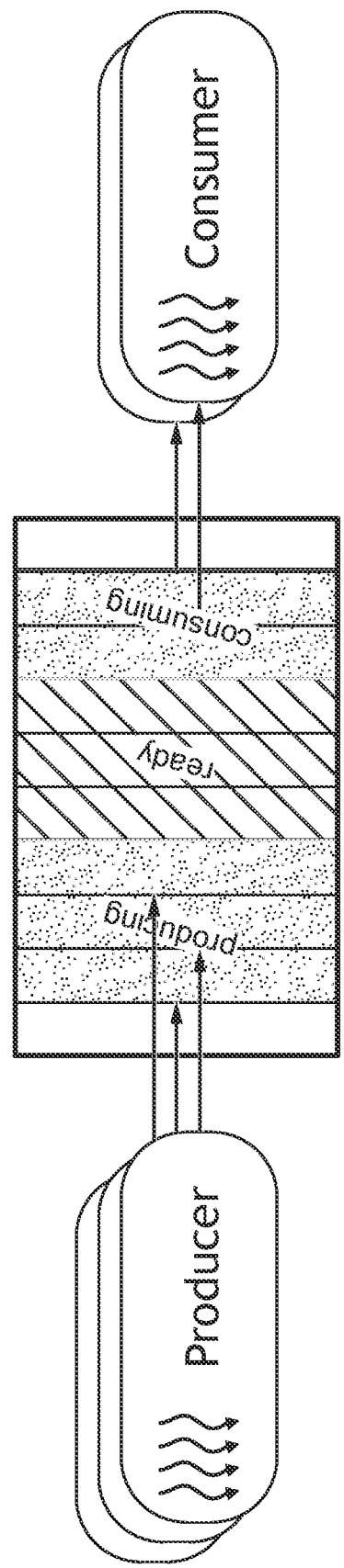
FIG. 11 shows an example resource-constrained scheduling using data marshalling with queues.

FIG. 11 shows how a producer(s) can be writing into a queue at the same time that a consumer(s) are reading data from that same queue. The queue thus may include a producing portion, a ready portion and a consuming portion. The producing portion contains valid data currently being written by a producer, the ready portion contains valid data that the producer previously wrote onto the queue and which has not yet begun being consumed by the consumer, and the consuming portion can contain valid data previously written by the producer that is currently being read by the consumer.

Figure 12:
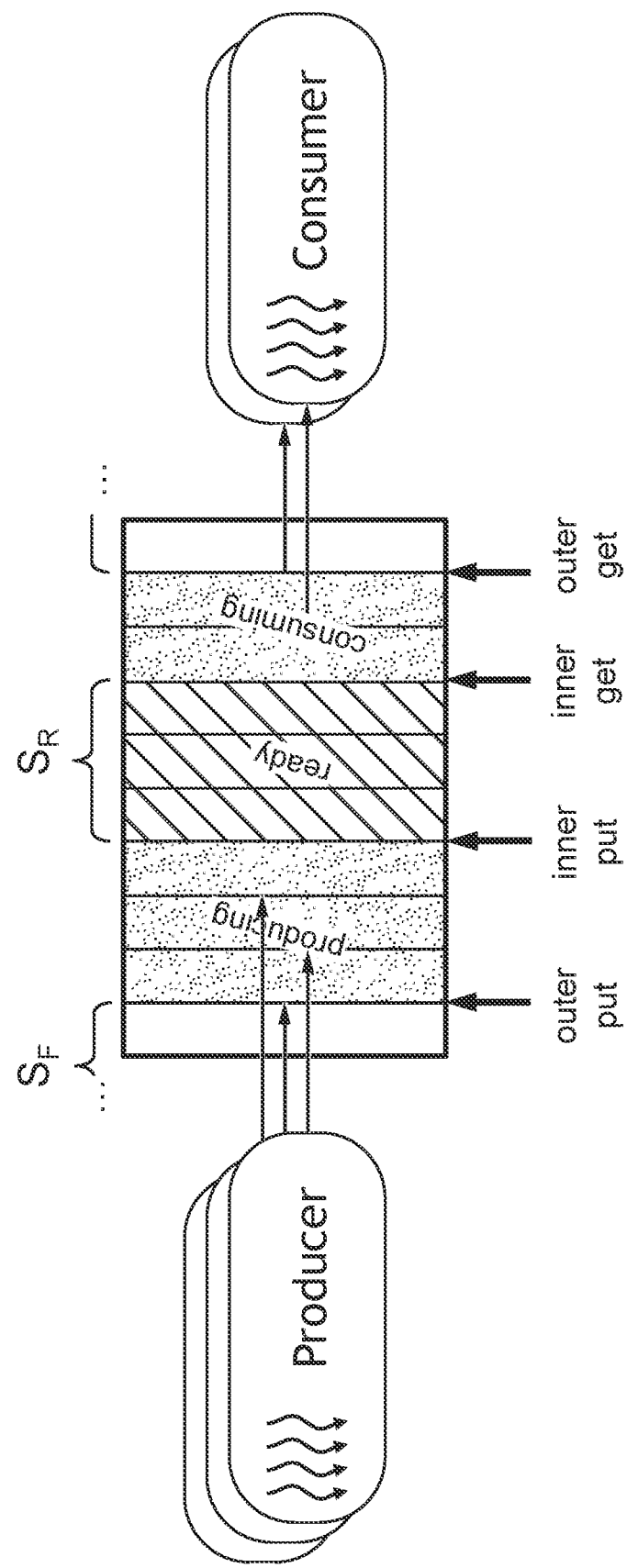
FIG. 12 shows an example resource-constrained scheduling using inner and outer puts and gets.

FIG. 12 shows how an example scheduler can implement data marshalling with a queue. In this example, the $S_F$ semaphore tracks how many free slots there are in the queue, and the $S_R$ semaphore tracks how many ready slots (i.e., slots containing valid data not yet released by the consumer) there are on the queue. The scheduler uses these two semaphores to determine whether (when) to launch new producers and new consumers. Along the bottom of FIG. 12 are shown four pointers: outer put, inner put, inner get and outer get. System software can use these four pointers to manage the queue. While the semaphores on the top and the pointers on the bottom appear to be tracking the same thing, in some embodiments the semaphores are maintained and updated by scheduling hardware circuitry whereas the pointers on the bottom are maintained and updated by application software. Decoupling the semaphore scheduling functions from the queue management functions in this way provides certain advantages including enabling a variety of use cases. For example, looking at FIG. 23, the $S_R$ semaphores for two different producers can be incremented by different amounts. In one embodiment the scheduler looks only at these semaphores to decide how many consumers to launch. Therefore, in this example there is no one-to-one correspondence between producers and consumers and the result is work amplification that launches multiple consumers (multiple instances of the same task, or different tasks, or both) per entry. This can be used to handle larger output sizes. An arbitrary number of consumers can be launched per entry, with all consumers "seeing" the same payload at their inputs. The consumers coordinate between themselves to advance the queue pointers that manage the queue itself. Such data parallel operations can be used to enable different consumers to perform different work on the input data, or to perform the same work on different parts of the input data, or more generally, to perform the same or different work on the same or different parts of the input data. This functionality is enabled by decoupling management of the state of the queue from the new work scheduling function provided by semaphores.

Figure 14:
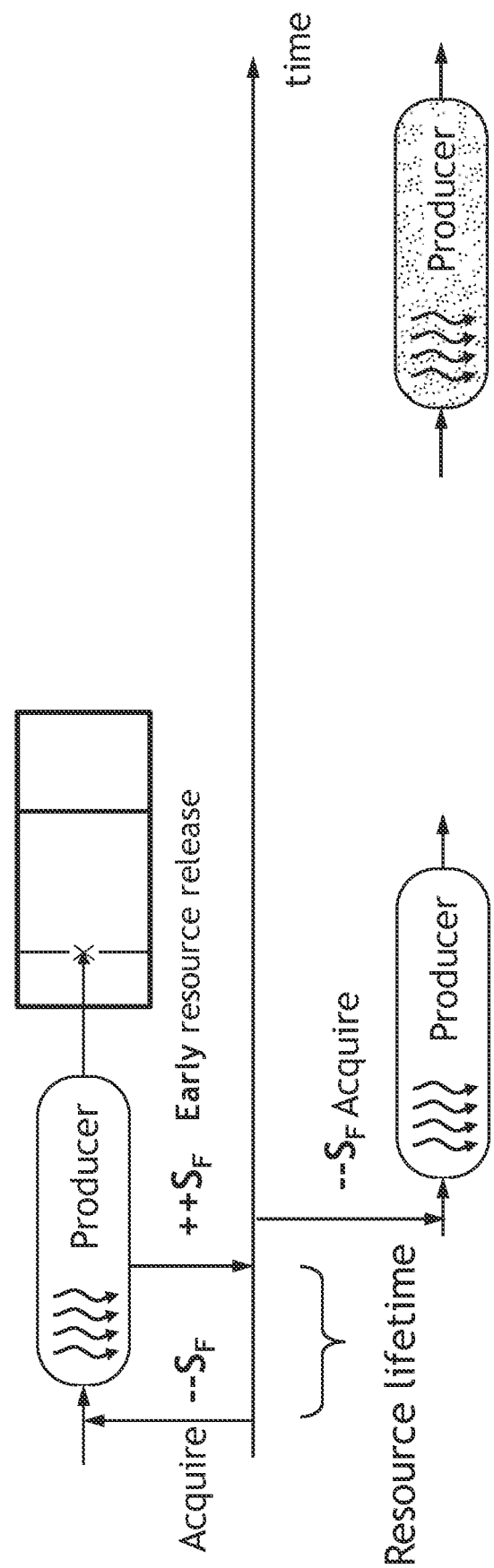
FIG. 14 shows an example non-limiting resource release providing early release if the producer generates no output.

FIGS. 13 & 14 show that in some embodiments, the producer can release the resource earlier if it does not need the resource after all. For example, suppose a producer is launched that conditionally generates an output. Before launch, the producer will declare the amount of the resource it will need if it does generate an output, and the scheduler handles this by subtracting from $S_F$ the amount of the resource that the producer declares it needs, thereby guaranteeing the producer can run to completion and preventing another producer from contending for that resource. However, if the producer during execution and before completion determines that it no longer needs some or all of that resource (e.g., because it determines it will generate less or no output), the producer can indicate this to the system scheduler by releasing its reservation of the resource. The resource lifetime is now much shorter, and the concurrency of the system can increase with reduced latency between release of the resource and starting the next producer. This is indicated by FIG. 14's move of the second producer to the left of the FIG. as compared to its FIG. 13 position. In particular, the first producer will increase $S_F$ accordingly, which enables the scheduler to immediately allow a second producer to acquire the resource so that the scheduler will again decrease $S_F$ to note the reservation to that second producer.

Figure 15:
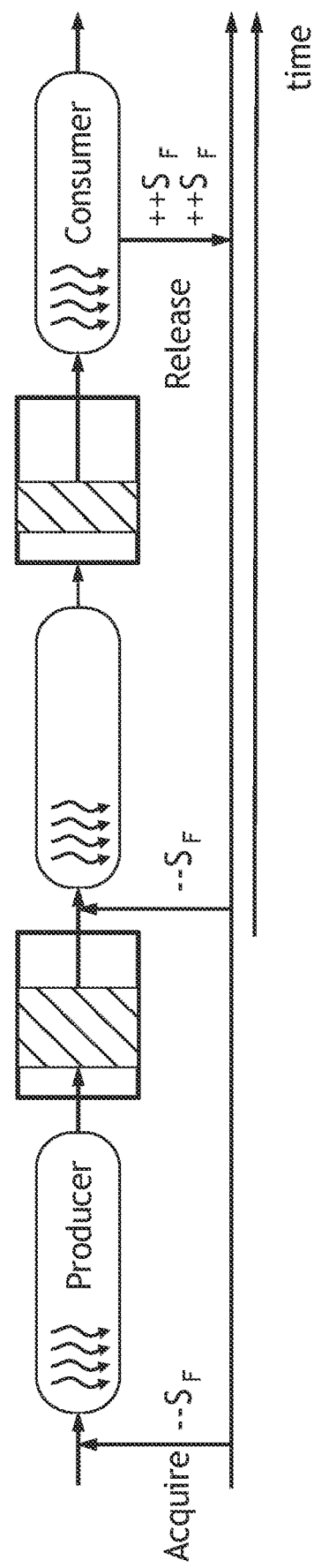
FIG. 15 shows an example non-limiting resource release if a later consumer needs visibility.

Furthermore, the releases can be issued by the producer, the consumer or even later stages in the pipeline. FIG. 15 shows a pipeline of three stages with the final release operation being performed by the grandchild of the producer (i.e., a pipeline stage downstream in the pipeline from the next successive stage after the producer in the pipeline sequence). Thus, a resource reservation can be maintained across multiple pipeline stages so long as the scheduler enforces consistent acquisition and release (i.e., the resource reservation amount is always counterbalanced by corresponding resource release amounts).

Figure 16:
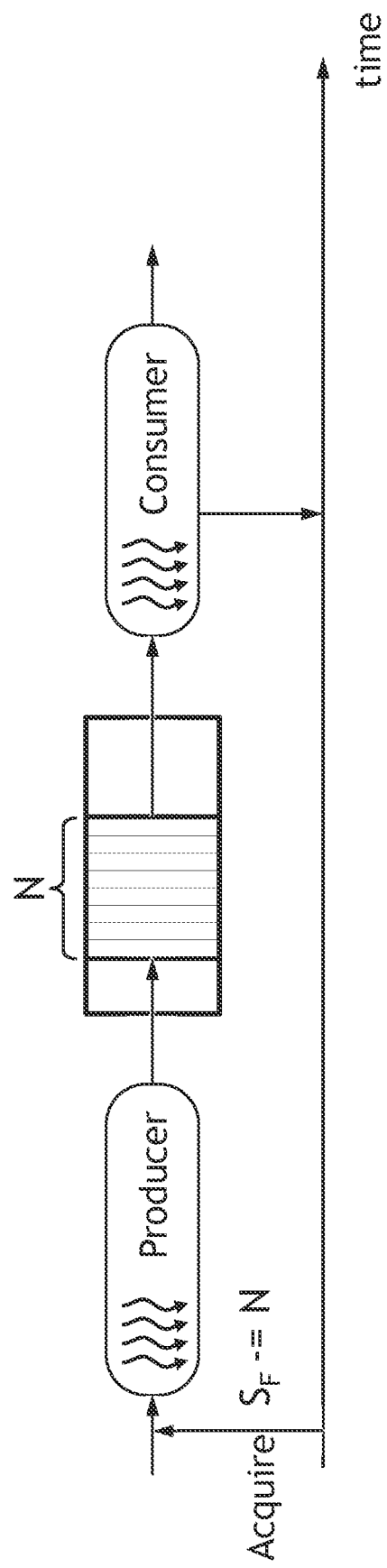
FIG. 16 shows an example non-limiting resource release including finer grained resource usage tracking.
Figure 17:
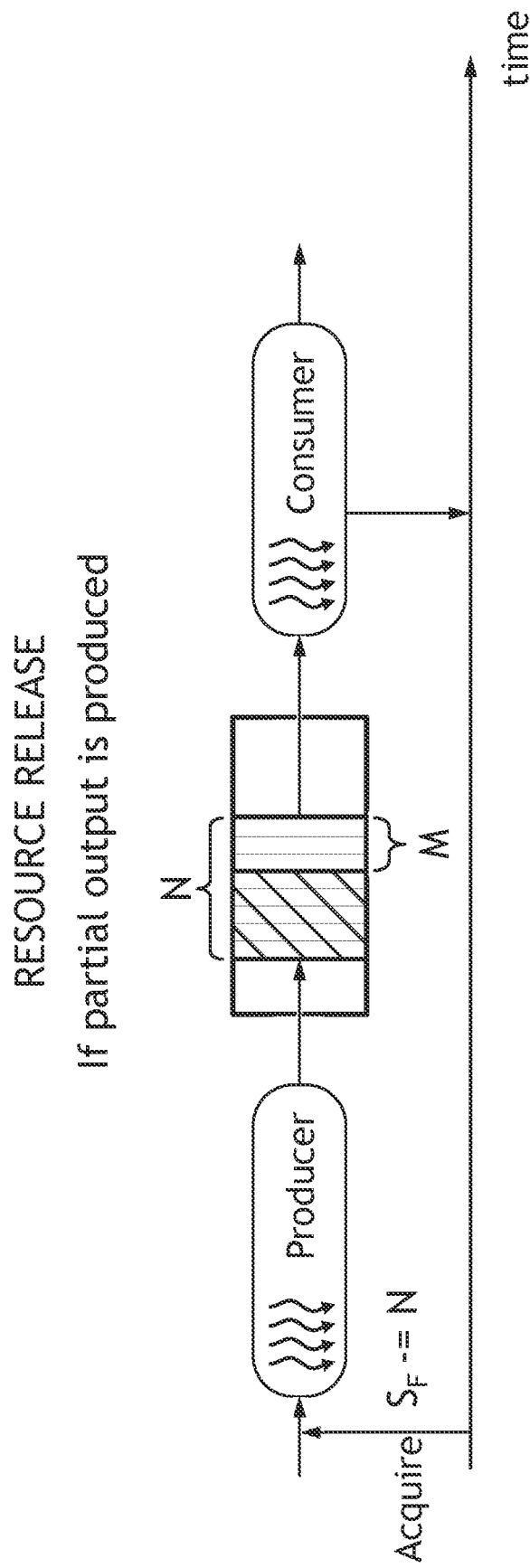
FIG. 17 shows an example non-limiting resource release if partial output is produced.
Figure 18:
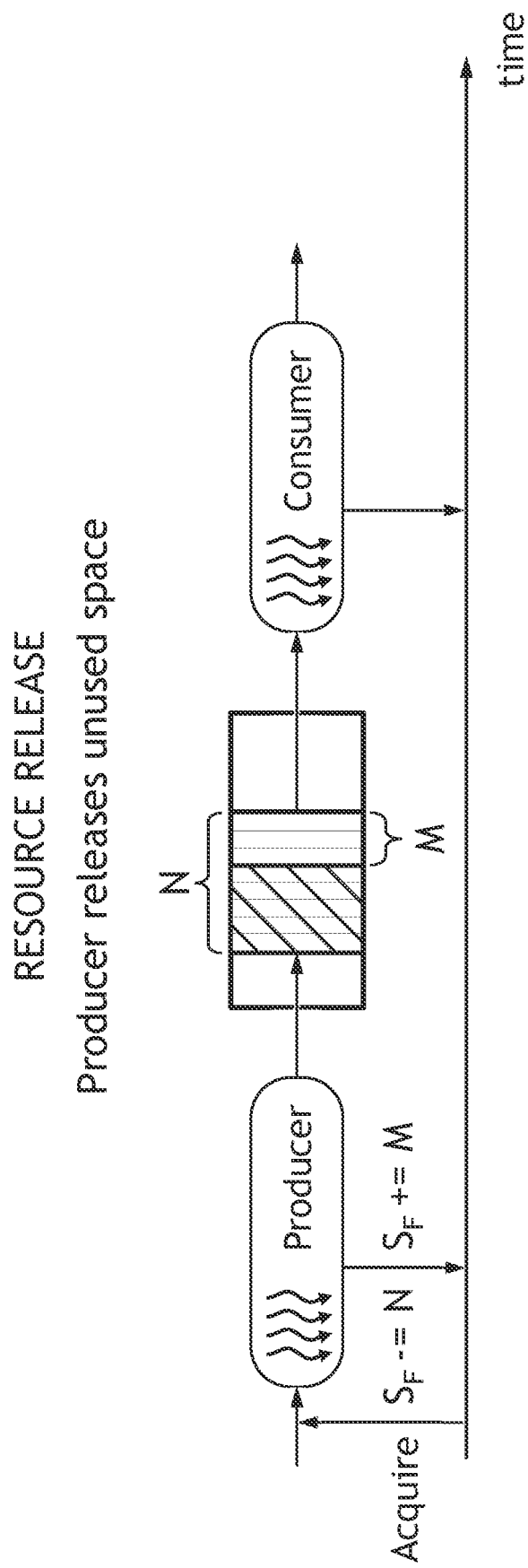
FIG. 18 shows an example non-limiting resource release when a producer releases unused space in a queue.
Figure 19:
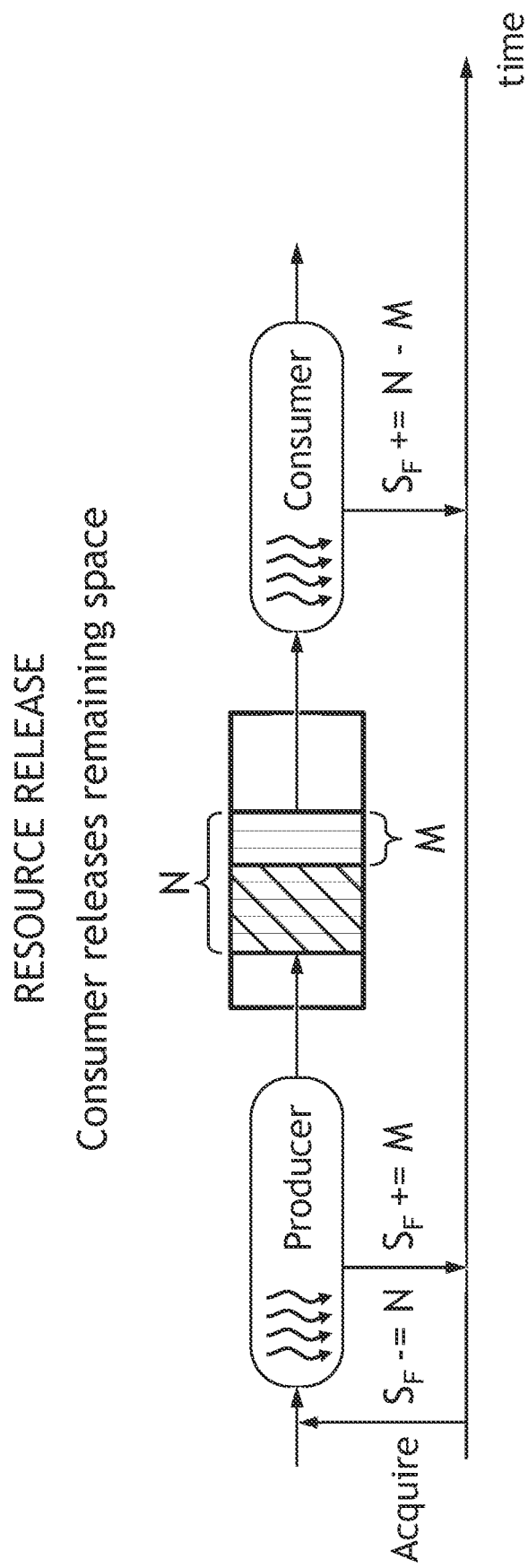
FIG. 19 shows an example non-limiting resource release in which a consumer releases remaining space.
Figure 20:
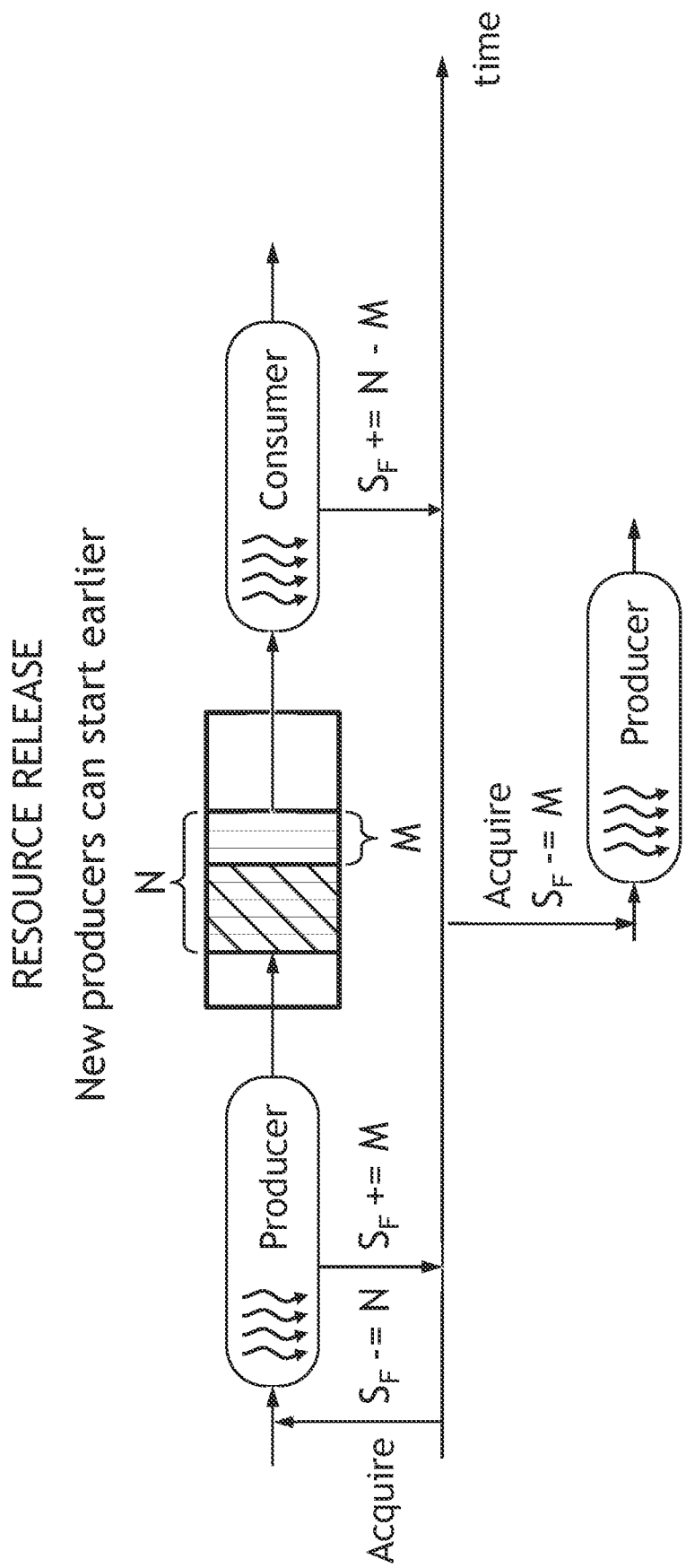
FIG. 20 shows an example non-limiting resource release to permit new producers to start earlier.

FIGS. 16-20 shows another example in which a producer releases the resource piecemeal. In FIG. 16, the producer acquires N unit of the resource. Upon producing partial output as in FIG. 17 (e.g., the system reserved N slots in a memory resource and the producer but the producer only outputted a few number of slots worth of data shown in the cross-hatched portion of FIG. 17 such as M-N slots worth), the producer can release unused space M (FIG. 18) which becomes available for use by another producer (FIG. 20). Upon the producer releasing the space M<N (FIG. 19), this implies that it has stored some valid data in the resource but does not need M slots which the scheduler can reserve to another producer that can now launch to use that released space M (FIG. 20). In this case, the producer is aware that N slots were reserved for it and it has used only M slots (like a restaurant diner that reserves a table for 8 but only 6 show up). In this case of partial release, the consumer is informed that it can read only N valid slots (FIG. 19), so as shown in FIG. 20, the consumer reads and then releases some part of the output ($S_F$+=N−M) and the other part M of the allocation is acquired by another producer. The semaphores $S_F$, $S_R$ thus can be used to indicate fractional resource usage, and a producer can give back the fraction that was not used. Another resource release from an unrelated producer/consumer can come in just in time, so the scheduler can launch another producer. This mechanism allows to handle variable output, up to the maximum size of N.

Figure 21:
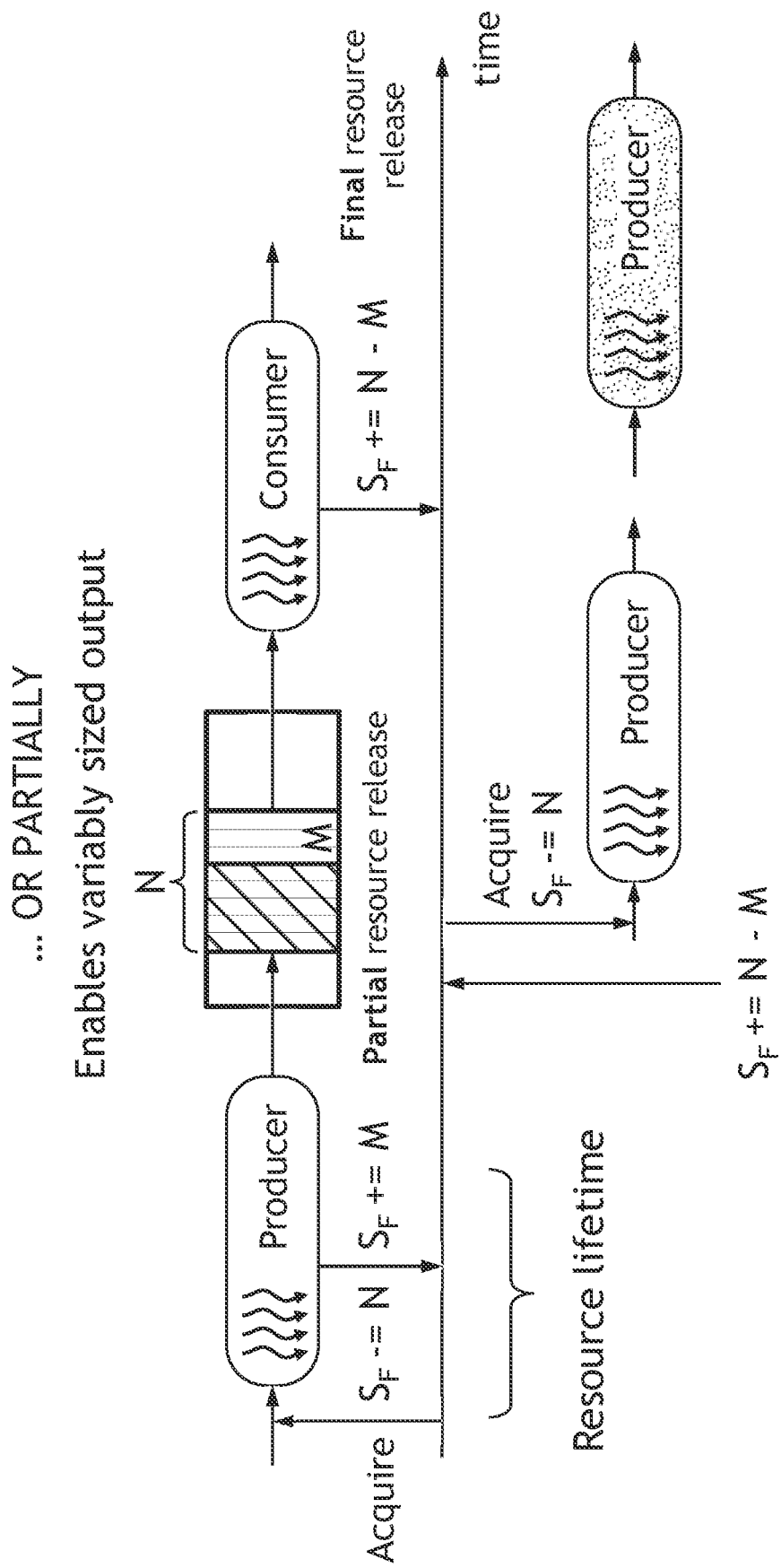
FIG. 21 shows an example non-limiting resource release permitting variable sized output in associated partial release.

FIG. 21 shows that the resource the usage of which the scheduler is tracking can be variably sized.

Example Cache Footprint Management

In one example embodiment, the resource that is acquired and released by the system scheduler can comprise the cache, and the semaphores $S_F$, $S_R$ track the number of cache lines that are used for the data flow between producers and consumers. Because many caches are designed to freely associate cache lines with memory locations, the memory locations are often not contiguous and data fragmentation within the cache is rather unpredictable. Nevertheless, the disclosed embodiment scheduler can track and manage cache (and main memory) usage with a single value $S_F$ because this value indicates merely how many cache lines are still available for acquiring by a thread block.

Figure 22:
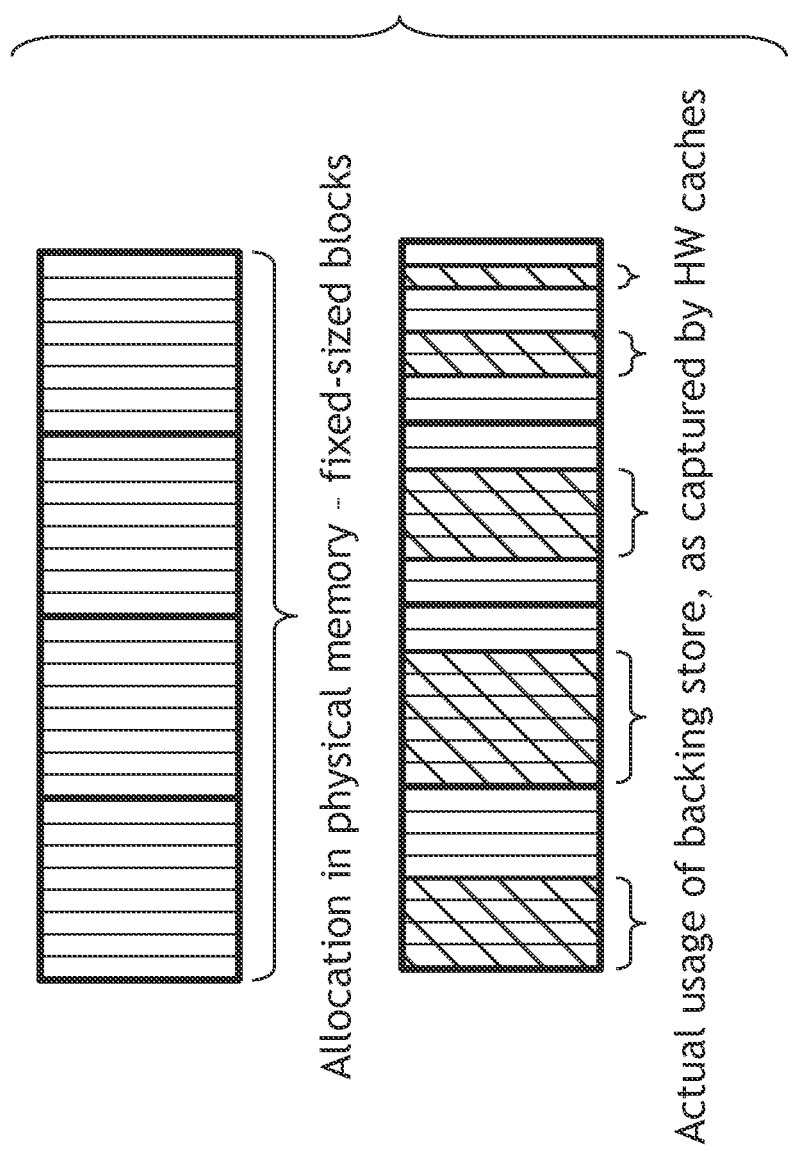
FIG. 22 shows example queue memory allocation schemes to avoid fragmentation.

As shown in FIG. 22, what the non-limiting embodiment scheduler tracks is the cache working set, meaning the cross-hatched cache lines that are actively in use. Hardware caches are excellent allocators, meaning that cache lines can be arbitrarily fragmented. When a producer writes to external memory via a fully associative cache, a cache line is allocated (similarly, if the producer does not write to part of external memory, no cache line is allocated). In practical implementations, caches are typically set-associative, so they do not have perfect behavior in this respect but are nevertheless close. What the system scheduler tries to do is to schedule toward an approximation of the way cache lines can be cheaply dynamically allocated.

The way the cache fragments fixed sized block main memory allocations within the cache can be ignored by the disclosed embodiment scheduler because scheduling decisions are not based on actual or worst case usage but rather on the total number of cache lines that have been reserved/acquired and released without regard for how those cache lines might map to physical memory addresses. This implies that allocation of cache lines to fixed-sized blocks of main memory (an advantage for software development is to use fixed size memory block allocation) can be managed by the cache and the system scheduler can track physical memory usage based merely on the total number of cache lines being used for the physical memory allocation without having to be concerned about which particular fixed sized memory blocks are or are not allocated. For example, producers may only partially write to each chunk of fixed block memory allocation, and consumers may only partially read it. But the schedule does not need to track which blocks are or are not read or written, since the cache automatically tracks this. Using the associated cache to track memory mapping avoids the need for the scheduler to use linked lists or any other mechanism that some other schedulers might need to use to track fragmentation of memory updates through physical external memory. The example scheduler can ignore fragmentation by using existing cache allocation mechanisms to manage fragmentation while still allowing the on-GPU data flow to remain in/through the on-chip cache. By managing the cache footprint in fixed sized chunks, the system gets the benefit of on-chip data flow by leveraging the ability of the cache to capture data flow that is sparse relative to a much larger memory allocation because the cache captures what is actually being read and written. The cache provides a limited working size that a scheduler can exploit if the scheduler can manage its working set to a limited size. The example non-limiting scheduling model enables this to happen. Example embodiments can layer on additional scheduling constraints that can make caching more efficient.

Furthermore, when a consumer finishes reading only (as opposed to updating) data from a cache line, it may be required to destroy (invalidate without pushing out to external memory) the cache line so it can be freed up and returned to the scheduler without the need to write the cache line back out to external memory. This means that data produced by a producer can be passed through the on-chip cache to a consumer without writing it out to external memory—saving memory cycles and memory bandwidth and reducing latency. Meanwhile, the scheduler is actively managing the cache by using resource constraint scheduling of the cache lines, which increases cache efficiency.

Generalizing Features Such as Work Amplification & Work Expansion

Figure 23:
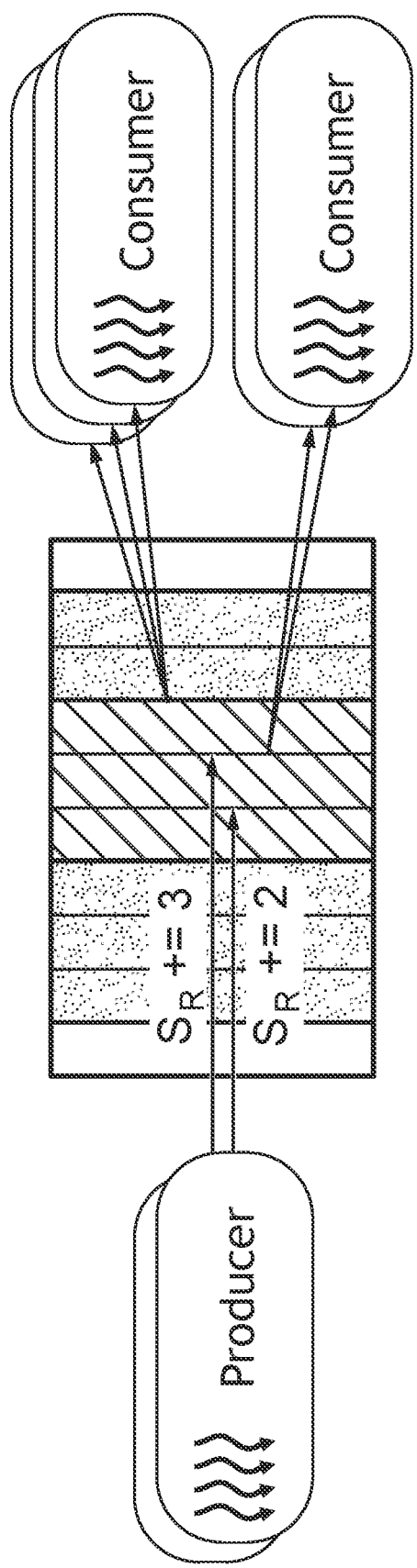
FIG. 23 shows example non-limiting work amplification launching multiple consumers per entry.

FIG. 23 and following show example non-limiting execution node graph topologies that can be constructed to use the disclosed scheduler embodiments. FIG. 23 was described above in connection with FIG. 12.

Figure 24:
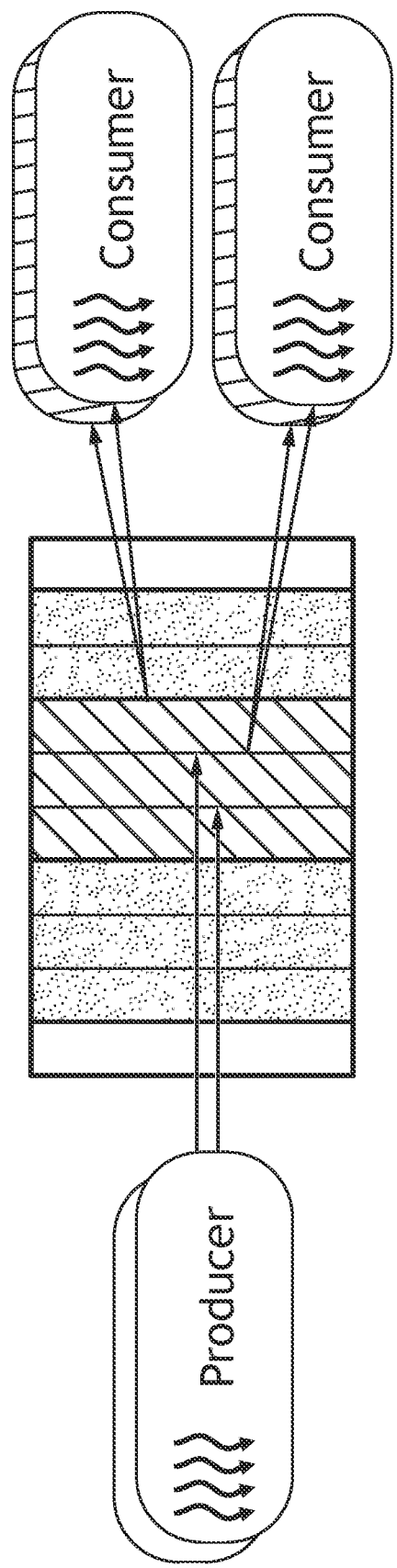
FIG. 24 shows an example non-limiting multi-cask (1 too many) launch scheme to launch multiple different consumers per entry.

FIG. 24 shows through use of shading that the consumers which are launched needn't be the same programs. Multiple instances of the same consumer or plural different consumers (i.e., different instances of the same task, or different tasks) can be launched from the same queue at the same time.

Figure 25:
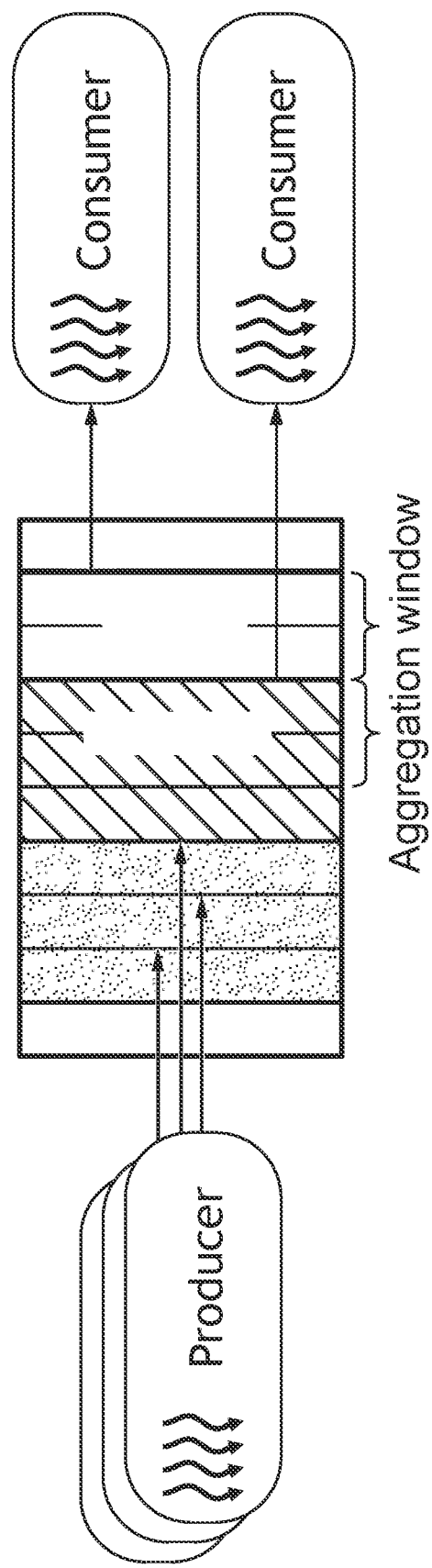
FIG. 25 shows an example non-limiting work aggregation in which a group of work items are aggregated into single consumer launch.

FIG. 25 shows an example of work aggregation, a mechanism that is complimentary to work expansion. Here, a producer is enqueueing some work in a special queue that will not launch consumers immediately. Rather, the queue is programmed with an aggregation window that allows it to group and handle together work that the producer produces within a certain time window and/or based on a certain quantity of elements produced by the producer. In one example, the queue will try to gather up to a user-specified number of work items before launching an instance of the consumer task. The queue will also report to the launched consumer(s) how many items it was able to collect (minimum=1, maximum=user specified value). To use this feature, FIG. 9 would be modified to compare to this programmed value and $S_R$ will be incremented by this programmed value. This use case is useful for example to use hardware support to ensure that all threads in a thread block have data to process when the thread block launches.

Figure 26:
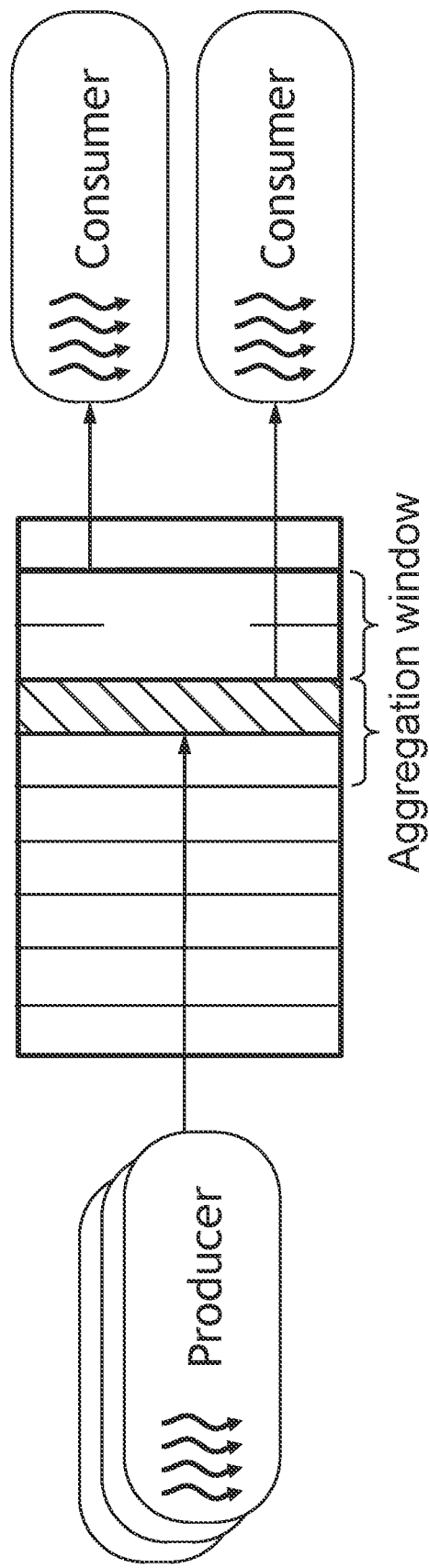
FIG. 26 shows non-limiting work aggregation including timeout results in a partial launch.

FIG. 26 shows what happens upon timeout to restore coherence. If the aggregating window of FIG. 25 does not become fully populated, then a timeout occurs and a partial launch occurs to reduce latency. In such partial launches, the $S_R$ semaphore is decremented by the number of elements that have actually been launched rather than the user-defined programmable value. The timeout puts an upper bound on how long the queue will wait before launching consumers.

Figure 27:
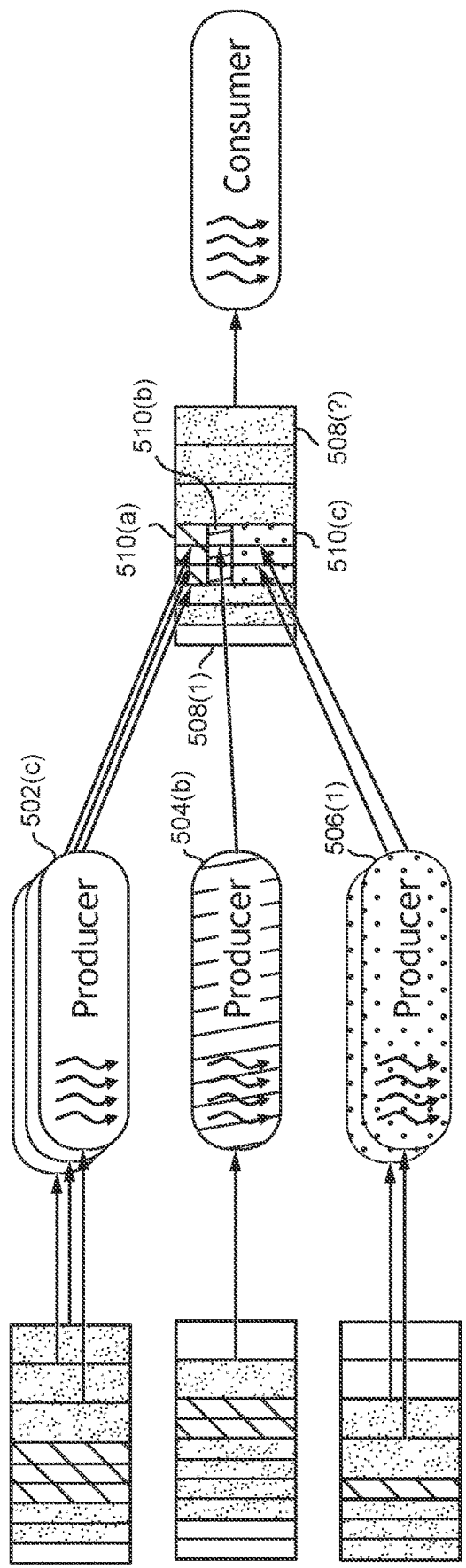
FIG. 27 shows an example join allocation including a group of separately computed fields gathered into a work item.

FIG. 27 shows an example join operation. The different producers 502 provide different pieces of work that are trying to fill out a common structure having different fields corresponding to the different producer. In the example shown, each of the three producers writes fields into each of the output data records 508(1), 508(n) where each output data record contains three fields 510(a), 150(b), 510(c) corresponding to the three producers 502(a), 502(b), 502(c), respectively. That is, data producer 502(a) writes to field 510(a), data producer 502(b) writes to field 502(b), and data producer 502(c) writes to field 502(c) of each output record 508. Each producer 502 thus has its own independent notion of space in the output buffer. Each producer 502 has its own respective free semaphore $S_F$ that allows the producer to fill out its own fields 510 so long as there is space. There are thus three redundant free semaphores $S_F A$, $S_F B$ and $S_F C$ that all refer to the same output records but each track a different set of fields 510 in those output records. Thus, these semaphores map to resource occupancy one-to=one in this example embodiment, but other arrangements are possible.

In the example shown, the last producer 506 to fill its respective last record field is responsible for advancing the ready semaphore $S_R$ to indicate that the output records 508 are valid to be read by the consumer. Because the scheduling is so simple, relatively small amounts of scheduling hardware can be used to manage a relatively complicated output data structure.

Figure 28:
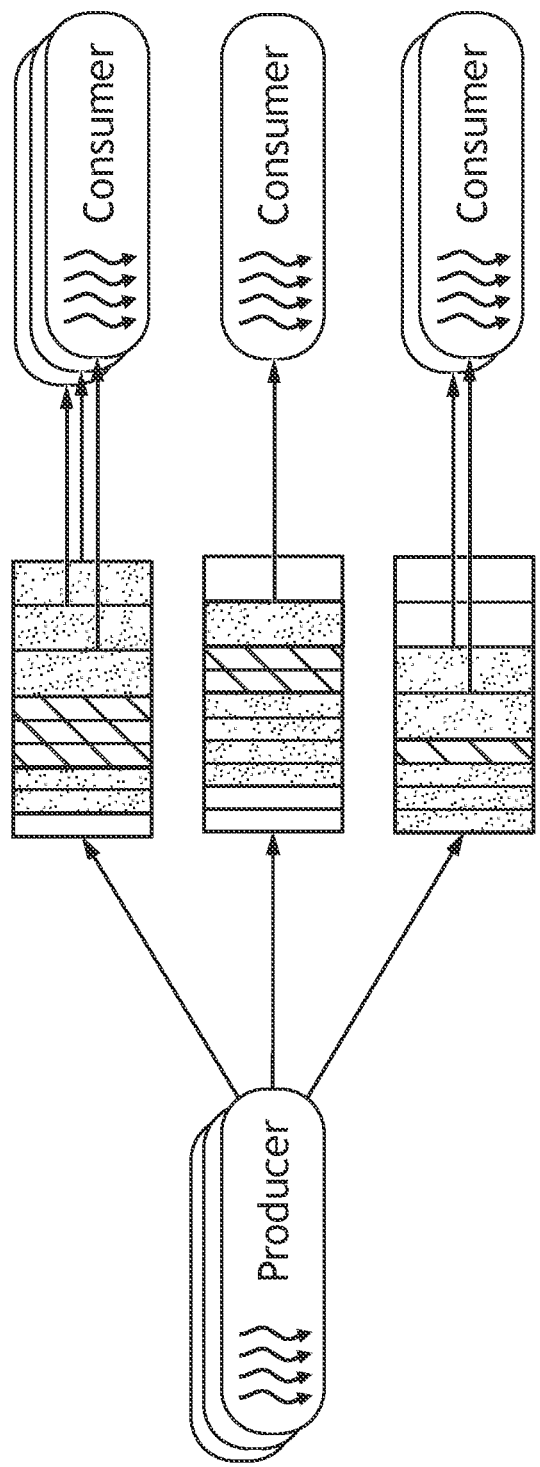
FIG. 28 shows example non-limiting work sorting into multiple queues using aggregation to re-converge execution.

FIG. 28 shows work sorting into multiple queues using aggregation to re-converge execution. Here a producer outputs to three different queues that marshal data to three different consumers. The scheduling mechanisms described herein apply to each of the three queues.

Figure 29:
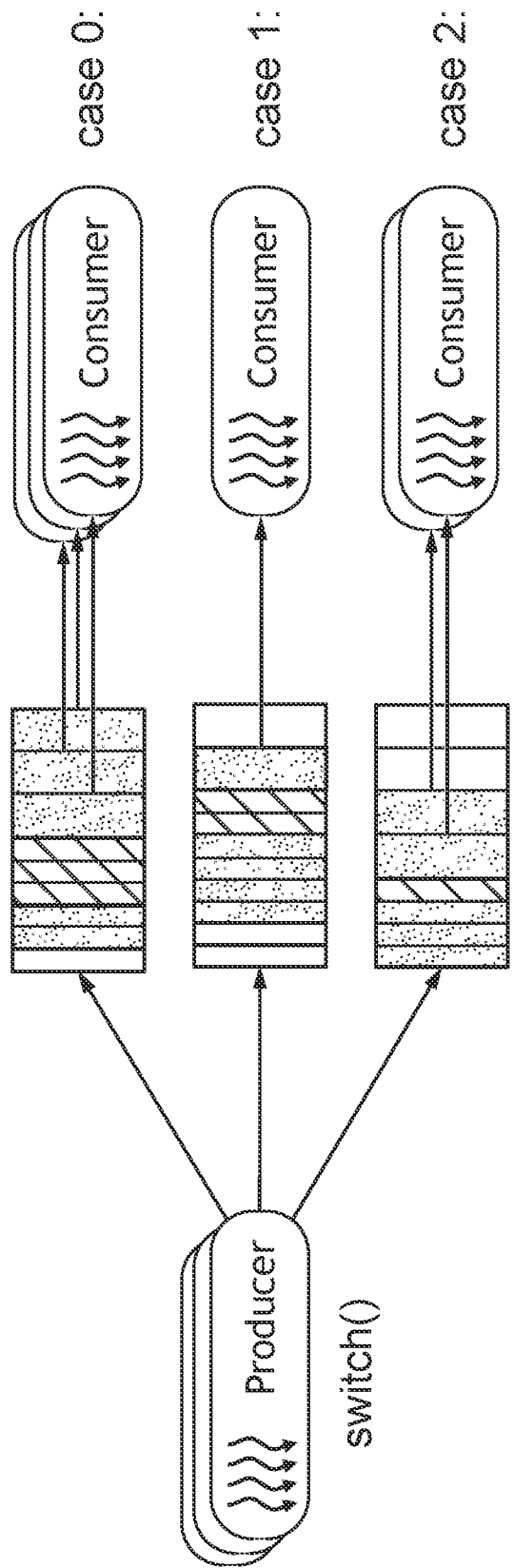
FIG. 29 shows example non-limiting work sorting into multiple queues for shader specialization.
Figure 30:
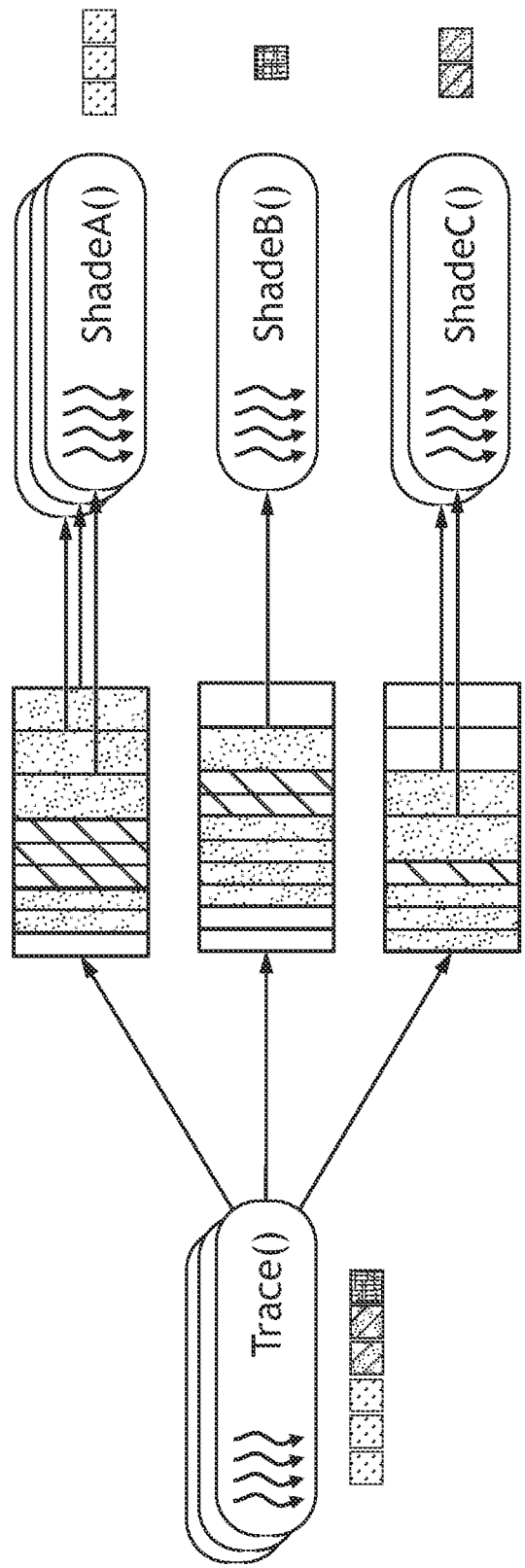
FIG. 30 shows example non-limiting work sorting into multiple queues for coherent material shading in raytracing.

FIG. 29 shows example work sorting into multiple queues for shader specialization, and FIG. 30 shows work sorting to decrease divergence in real time ray tracing. Rays can generate randomly divergent work. By arranging multiple queues in these topologies along with coalescing (shown by elements become bigger on the tail ends of the queue), coherence of processing is increased to reduce random divergence. Such aggregation can be used to sort the work into coherent batches. This arrangement can be used anytime there is divergence in the system.

Figure 31:
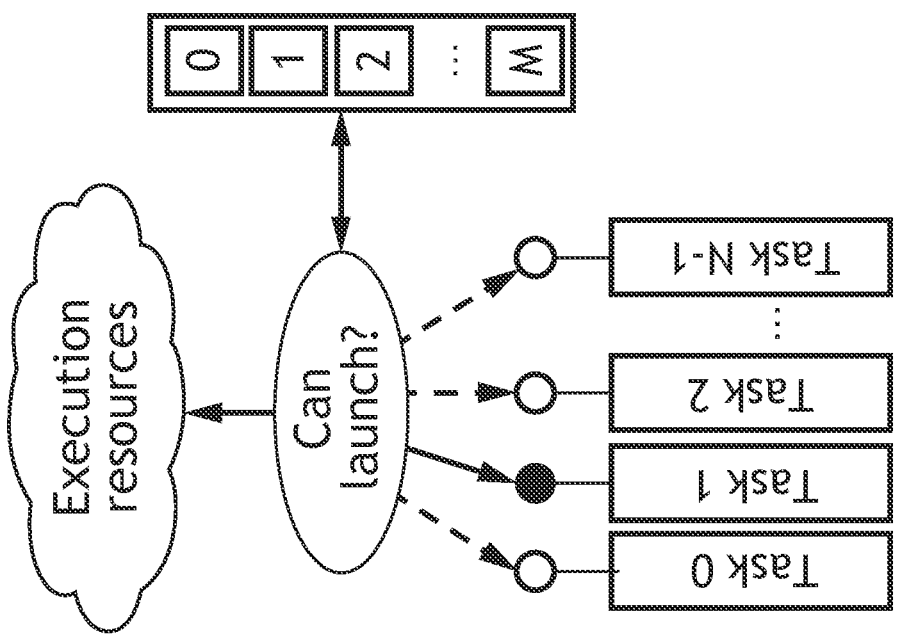
FIG. 31 shows example non-limiting dependency scheduling.

FIG. 31 shows a basic dependency scheduling model that generalizes the above to select which of multiple tasks to launch based on dependency on task that have already completed.

Figure 32:
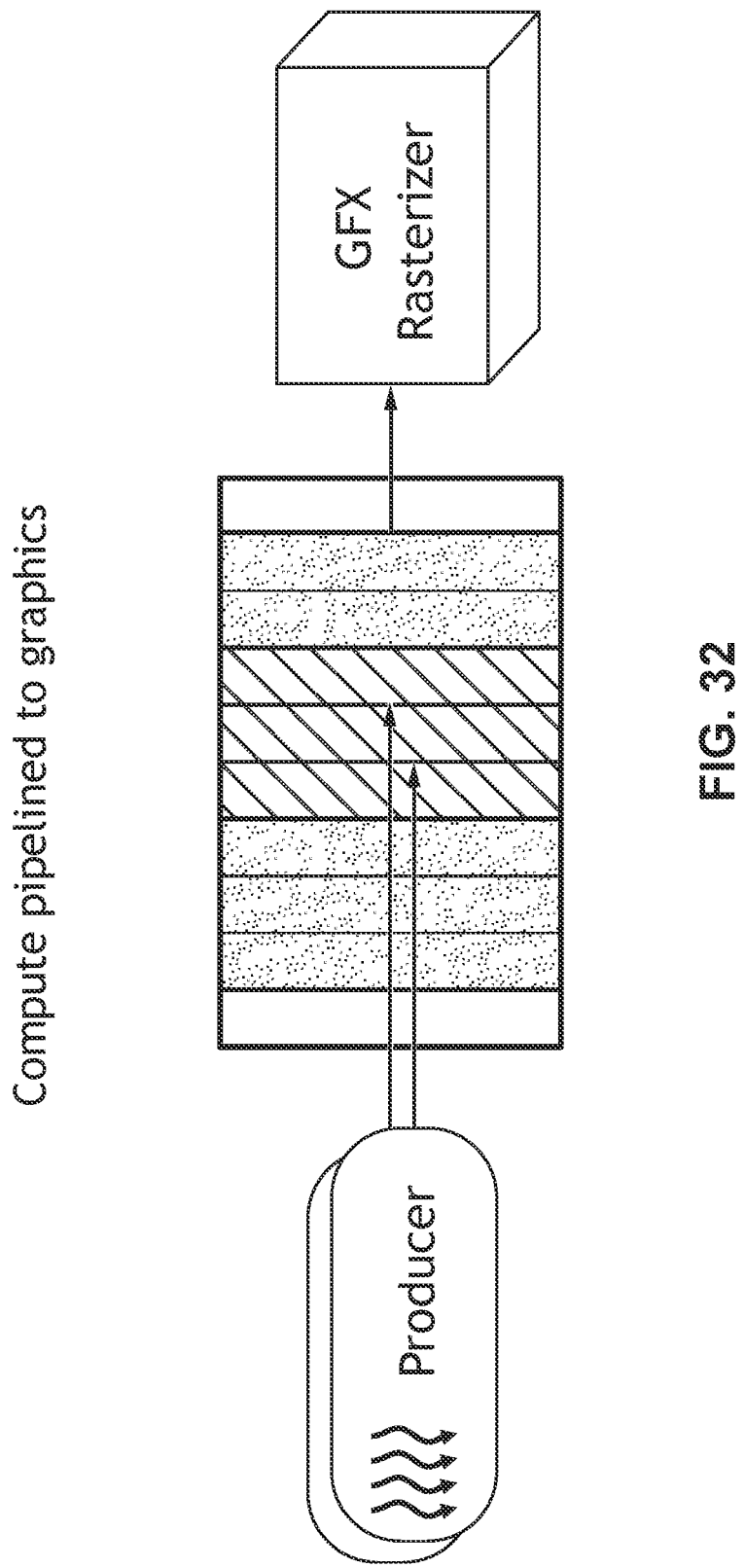
FIG. 32 shows example non-limiting compute pipelined to graphics.
Figure 33:
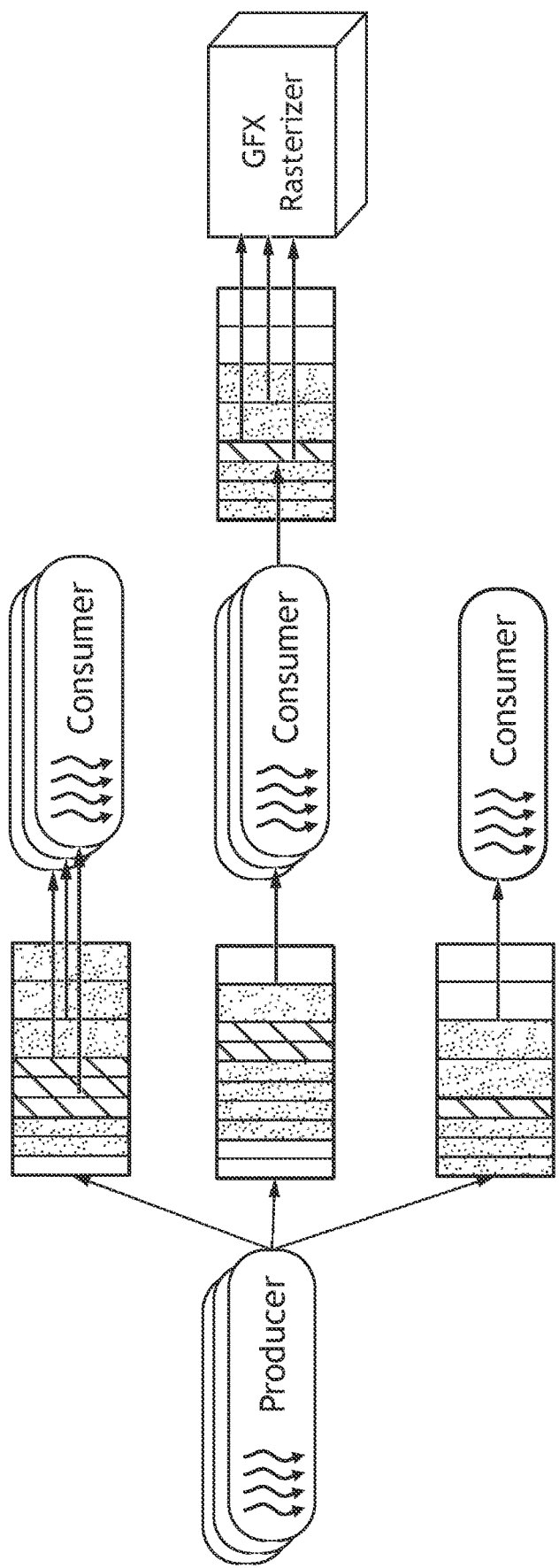
FIG. 33 shows example non-limiting compute feeding graphics to enable fully flexible compute front-ends.

FIGS. 32 & 33 show examples of how these generalized concepts can be used to implement graphics tasks and a graphics pipeline that feeds a graphics rasterizer.

All patents and publications cited herein are incorporated by reference for all purposes as if expressly set forth.

The invention claimed is:

1. A scheduler comprising:
a set of free semaphores,
a set of ready semaphores, and
hardware circuitry operatively coupled to the set of free semaphores and the set of ready semaphores, the hardware circuitry configured to change state of a free semaphore in the set of free semaphores in response to reserving a resource and when the resource is released, the hardware circuitry being further configured to change state of a ready semaphore in the set of ready semaphores in response to valid data outputted by a producer and in response to consumption of the valid data by a consumer,
wherein the scheduler launches a task in response to the states of the free semaphore and a ready semaphore in the set of ready semaphores.

2. The scheduler of claim 1 wherein the free semaphore and the ready semaphore each comprise counters.

3. The scheduler of claim 1 wherein the scheduler launches the task when the free semaphore and the ready semaphore are each non-zero.

4. The scheduler of claim 1 wherein the scheduler cooperates with software-defined data marshalling that manages the resource.

5. The scheduler of claim 1 wherein the hardware circuitry reduces the free semaphore in response to reserving the resource for a task and the task increases the free semaphore upon releasing the reserved resource.

6. The scheduler of claim 1 wherein the resource is used to pass data between successive tasks in a graph.

7. The scheduler of claim 1 wherein the semaphores represent at least one of availability of free space in a memory buffer or amount of cache pressure induced by data flow in a network or presence of work items to be processed.

8. The scheduler of claim 1 wherein the hardware circuitry allocates resources at time of launch to guarantee thread blocks can run to completion.

9. The scheduler of claim 1 wherein the hardware circuitry does not scale or grow with the number of work items or the number of concurrently executing thread groups from the same task/node.

10. The scheduler of claim 1 wherein the hardware circuitry monitors resource constraints imposed in a chip to minimize an amount of off-chip memory bandwidth required to communicate transient data.

11. The scheduler of claim 1 wherein the hardware circuitry manages external memory allocation by monitoring reservation of cache lines of an associative cache.

12. The scheduler of claim 11 wherein the cache is configured to capture data flow between compute stages without writing the data flow to external memory.

13. The scheduler of claim 1 wherein the scheduler enables fine grain synchronization by not synchronizing in bulk.

14. A GPU scheduling method comprising:
(a) subtracting from a free semaphore to thereby reserve a resource for a task to be launched,
(b) changing state of a ready semaphore in response to valid data outputted by a producer and in response to consumption of the valid data by a consumer,
(c) programmatically adding to the free semaphore and/or to the ready semaphore when the task is finished using the reserved resource, and
(d) reserving the resource for another task in response to testing the free semaphore and the ready semaphore.

15. The GPU scheduling method of claim 14 including performing (a)-(d) in hardware.

* * * * *